(12) United States Patent
Takahashi et al.

(10) Patent No.: US 6,525,854 B1
(45) Date of Patent: Feb. 25, 2003

(54) PORTABLE RADIO TERMINAL WITH INFRARED COMMUNICATION FUNCTION, INFRARED EMISSION POWER CONTROLLING METHOD BETWEEN PORTABLE RADIO TERMINAL AND APPARATUS WITH INFRARED COMMUNICATION FUNCTION

(75) Inventors: Naoyuki Takahashi, Sendai (JP); Tsutomu Satoh, Sendai (JP); Hiroshi Mori, Sendai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/220,303

(22) Filed: Dec. 23, 1998

(30) Foreign Application Priority Data

Dec. 24, 1997 (JP) .............................................. 9-355888
Oct. 19, 1998 (JP) ............................................ 10-297340

(51) Int. Cl.⁷ .............................................. H04B 10/00
(52) U.S. Cl. ...................... 359/143; 359/110; 359/142; 359/145; 359/172; 340/825.72
(58) Field of Search .................................. 359/110, 143, 359/142, 161, 145, 152, 172, 146; 455/127, 89, 90, 38.3, 115, 343; 379/59, 61, 56.3, 56.1, 58; 340/825.72, 825.69, 825.22, 825.44

(56) References Cited

U.S. PATENT DOCUMENTS

| | | | | |
|---|---|---|---|---|
| 5,201,067 A | * | 4/1993 | Grube et al. .................... | 455/89 |
| 5,301,353 A | * | 4/1994 | Borras et al. .................... | 455/9 |
| 5,479,595 A | * | 12/1995 | Israelsson .................... | 359/145 |
| 5,801,860 A | * | 9/1998 | Yoneyama .................... | 359/124 |
| 5,808,760 A | * | 9/1998 | Gfeller ....................... | 359/110 |
| 5,822,099 A | * | 10/1998 | Takamatsu .................... | 359/153 |
| 5,907,418 A | * | 5/1999 | Walczak et al. ............. | 359/124 |
| 5,917,425 A | * | 6/1999 | Crimmins et al. ...... | 340/825.49 |
| 6,104,512 A | * | 8/2000 | Batey, Jr. et al. ........... | 359/152 |
| 6,175,434 B1 | * | 1/2001 | Feng ........................... | 359/152 |
| 6,271,945 B1 | * | 8/2001 | Terahara ...................... | 359/124 |

FOREIGN PATENT DOCUMENTS

| | | |
|---|---|---|
| JP | 62-42635 | 2/1987 |
| JP | 2-1630 | 1/1990 |
| JP | 2-280427 | 11/1990 |
| JP | 5-137182 | 6/1993 |
| JP | 7-245591 | 9/1995 |
| JP | 9-171422 | 6/1997 |
| JP | 9-172409 | 6/1997 |

* cited by examiner

*Primary Examiner*—Leslie Pascal
*Assistant Examiner*—Hanh Phan
(74) *Attorney, Agent, or Firm*—Katten, Muchin, Zavis, Rosenman

(57) ABSTRACT

The invention provides a portable radio terminal with an infrared communication function by which, even if the communication distance varies, appropriate infrared emission power control can be performed to achieve reduction in power consumption in infrared communication by detecting the other party of infrared communication or a reception power. The portable radio terminal with an infrared communication function comprises an infrared communication section for transmitting and receiving a signal in an infrared frequency band, a communication object party detection section for detecting information of the other party of infrared communication, and a control section for controlling an emission power of the infrared communication section in response to information of the other party of infrared communication detected by the communication object party detection section.

5 Claims, 21 Drawing Sheets

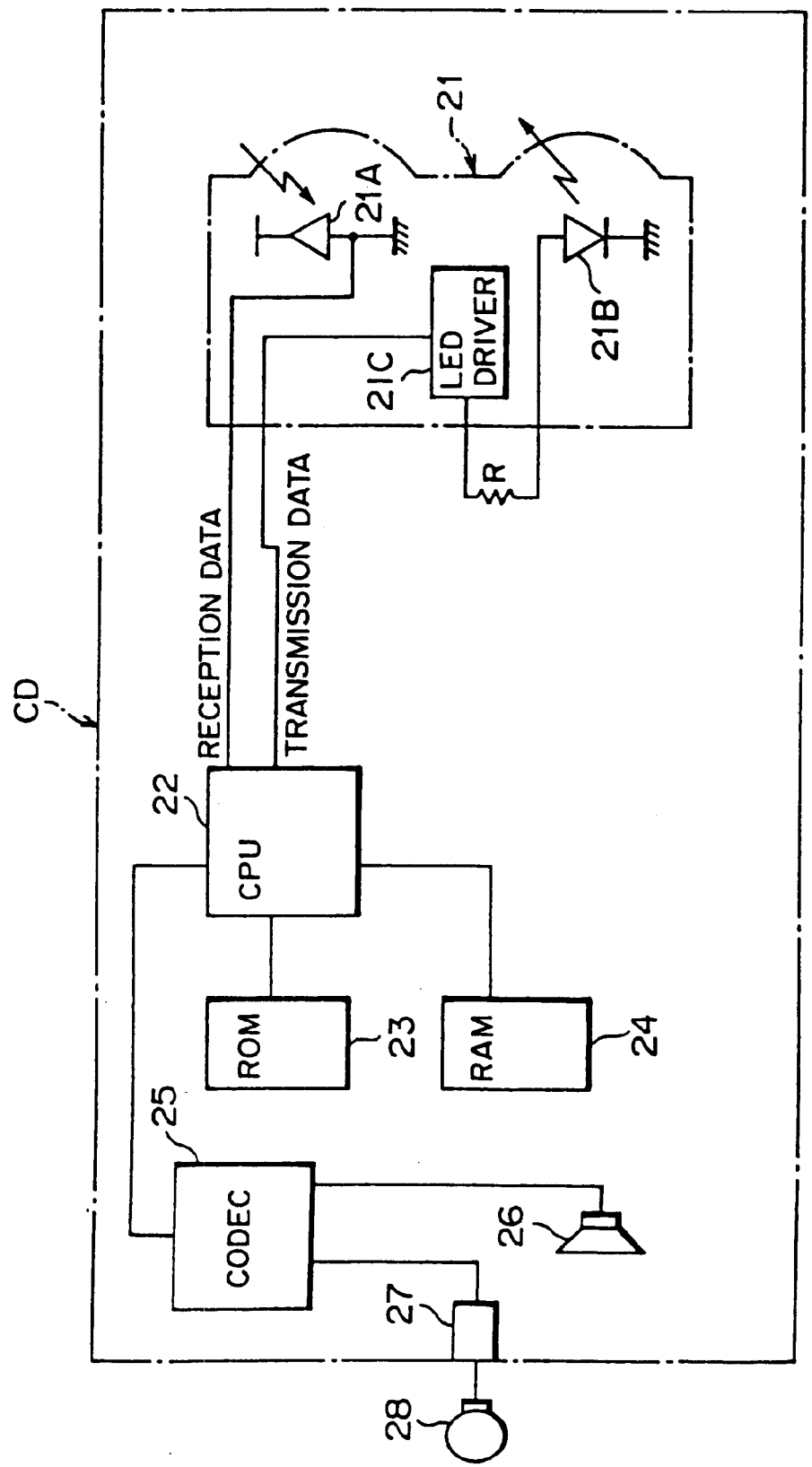

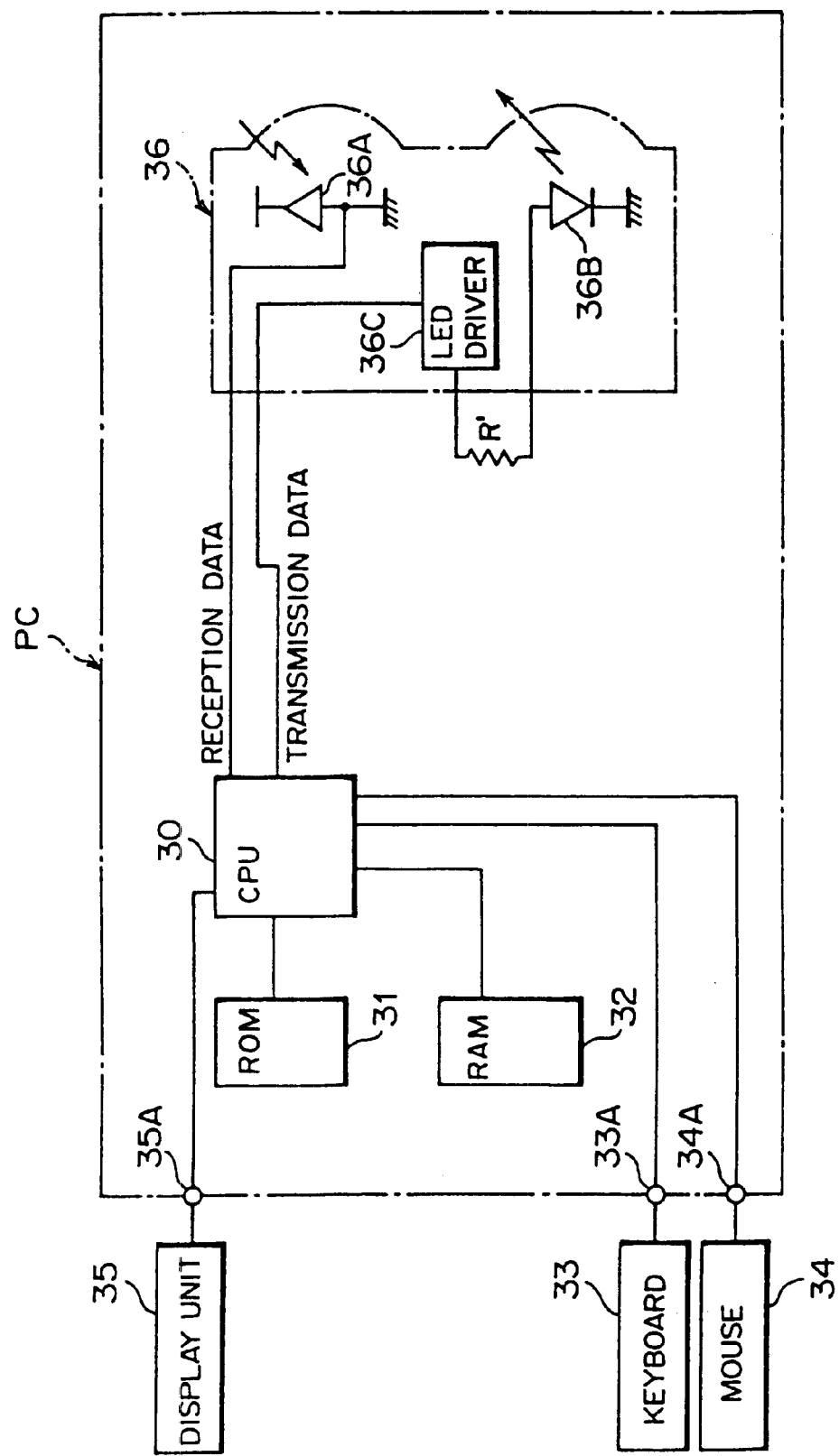

PORTABLE RADIO TERMINAL WITH INFRARED COMMUNICATION FUNCTION, INFRARED EMISSION POWER CONTROLLING METHOD BETWEEN PORTABLE RADIO TERMINAL AND APPARATUS WITH INFRARED COMMUNICATION FUNCTION

BACKGROUND OF THE INVENTION

1) Field of the Invention

This invention relates to a portable radio terminal with an infrared communication function and an infrared emission power controlling method between a portable radio terminal and an apparatus with an infrared communication function.

2) Description of the Related Art

In recent years, diversification in form of utilization of a portable radio terminal has been and is proceeding. For example, a portable radio terminal has been proposed which not only has an original radio communication function but also utilizes infrared communication, for which no cable is used, for data communication or like communication which is performed with a terminal such as a personal computer at a comparatively short distance. A portable radio terminal which has an infrared communication function in addition to an original radio communication function in this manner is called portable radio terminal with an infrared communication function.

When such a portable radio terminal with an infrared communication function as just described performs data communication with a terminal such as a personal computer at a comparatively short distance, the terminal-to-terminal communication distance is approximately 100 cm according to the standards of the IrDA (Infrared Data Association). Accordingly, the emission power to be used for infrared communication is set to a value which can sufficiently cover the communication distance.

By the way, such a portable radio terminal with an infrared communication function as described above not only is used to perform data communication with a personal computer or the like as described above, but also is sometimes used while it is set in position on a cradle (which signifies a vehicle-carried adapter having a power supplying function, a hand-free function, a communication function with a portable terminal and so forth. In the following description, the term "cradle" is used in the same meaning.) so as to allow hand-free use of the portable radio terminal in a cabin of an automobile. In this instance, for better convenience in use, also the cradle and the portable radio terminal should be connected to each other by infrared communication.

Where such infrared communication between a portable radio terminal and a cradle as described above is considered, while the communication between them is communication over a very short distance of approximately 1 cm, since the emission power to be used for infrared communication is set to a value with which the communication distance of approximately 100 cm can be covered sufficiently, even if communication should be performed over a very short distance between the terminal and the cradle, electric current similar to that consumed in communication over 100 cm is consumed. This reduces the available time of the battery and gives rise to a subject to be solved in that the portable radio terminal cannot be used for a long time. In other words, also in order to satisfy a demand for a long waiting time of a portable radio terminal in recent years, reduction in power consumption in infrared communication is an important subject to a portable radio terminal with an infrared communication function.

SUMMARY OF THE INVENTION

It is an object of the present invention to provide a portable radio terminal with an infrared communication function and an infrared emission power controlling method between a portable radio terminal and an apparatus with an infrared communication function by which, even if the communication distance varies, appropriate infrared emission power control can be performed to achieve reduction in power consumption in infrared communication by detecting the other party of infrared communication or a reception power.

In order to attain the object described above, according to an aspect of the present invention, there is provided a portable radio terminal with an infrared communication function, comprising an infrared communication section for transmitting and receiving a signal in an infrared frequency band, communication object party detection means for detecting information of the other party of infrared communication, and control means for controlling an emission power of the infrared communication section in response to information of the other party of infrared communication detected by the communication object party detection means.

With the portable radio terminal with an infrared communication function, even if the communication distance varies, appropriate infrared emission power control can be performed by recognizing the other party of infrared communication or a reception power. As a result, the portable radio terminal with an infrared communication function is advantageous in that, upon communication over a very short distance, low power consumption in infrared communication can be achieved sufficiently, but upon normal infrared communication, infrared communication in a sufficient emission power condition can be performed.

The communication object party detection means may detect the information of the other party of infrared communication from data received from the other party of infrared communication through the infrared communication section or from a connection condition of an external terminal of the portable radio terminal.

Where the information of the other party of infrared communication is detected in this manner, appropriate power control for the other party of infrared communication can be performed and low power consumption can be achieved.

According to another aspect of the present invention, there is provided a portable radio terminal with an infrared communication function which can be placed on and used with a vehicle-carried adapter having a communication function by infrared rays, comprising an infrared communication section for transmitting and receiving a signal in an infrared frequency band, an identification section for identifying the other party of infrared communication, and a control section for decreasing, when the identification section detects that the other party of infrared communication is the vehicle-carried adapter, an emission power of the infrared communication section from an normal emission power.

With the portable radio terminal with an infrared communication function, there is an advantage that, upon communication over such a very short distance as in a case wherein the portable radio terminal is placed on the vehicle-carried adapter, the emission power can be decreased, and consequently, low power consumption in infrared communication can be achieved sufficiently.

According to a further aspect of the present invention, there is provided a portable radio terminal with an infrared communication function, comprising an infrared communication section for transmitting and receiving a signal in an infrared frequency band, reception power detection means for detecting reception power information from the other party of infrared communication, communication object party detection means for detecting infrared communication object party information, and control means for controlling an emission power of the infrared communication section using the reception power information detected by the reception power detection means and the infrared communication object party information detected by the communication object party detection means.

According to a still further aspect of the present invention, there is provided an infrared emission power controlling method between a portable radio terminal with an infrared communication function and an apparatus with an infrared communication function when a signal in an infrared frequency band is communicated between the portable radio terminal with an infrared communication function and the apparatus with an infrared communication function, comprising the step performed by at least one of the portable radio terminal and the apparatus of controlling an infrared emission power using reception power information from the other party of infrared communication and infrared communication object party information detected by communication object party detection means.

With the portable radio terminal with an infrared communication function and the infrared emission power controlling method, there is an advantage that, upon communication over a very short distance, fine control can be performed when the emission power is decreased from a high power to a low power and low power consumption in infrared communication can be achieved sufficiently, but upon normal infrared communication, infrared communication in a sufficient emission power condition can be performed.

According to a yet further aspect of the present invention, there is provided a portable radio terminal with an infrared communication function, comprising an infrared communication section for transmitting and receiving a signal in an infrared frequency band, reception power information reception means for receiving reception power information detected by and transmitted from the other party of infrared communication, and control means for controlling an emission power of the infrared communication section in response to the reception power information received by the reception power information reception means.

According to a yet further aspect of the present invention, there is provided an infrared emission power controlling method between a portable radio terminal with an infrared communication function and an apparatus with an infrared communication function when a signal in an infrared frequency band is communicated between the portable radio terminal with an infrared communication function and the apparatus with an infrared communication function, comprising the steps performed by at least one of the portable radio terminal and the apparatus of receiving reception power information detected by and transmitted from the other party of infrared communication, and controlling an infrared emission power based on a result of the detection.

Also with the portable radio terminal with an infrared communication function and the infrared emission power controlling method, there is an advantage that, upon communication over a very short distance, fine control can be performed when the emission power is decreased to a high power to a low power and low power consumption in infrared communication can be achieved sufficiently, but upon normal infrared communication, infrared communication in a sufficient emission power condition can be performed.

According to a yet further aspect of the present invention, there is provided a portable radio terminal with an infrared communication function, comprising an infrared communication section for transmitting and receiving a signal in an infrared frequency band, reception power detection means for detecting reception power information from the other party of infrared communication, and control means for controlling an emission power of the infrared communication section in response to the reception power information detected by the reception power detection means.

According to a yet further aspect of the present invention, there is provided an infrared emission power controlling method between a portable radio terminal and an apparatus with an infrared communication function when a signal in an infrared frequency band is communicated between the portable radio terminal with an infrared communication function and the apparatus with an infrared communication function, comprising the steps performed by at least one of the portable radio terminal and the apparatus of detecting reception power information from the other party of infrared communication, and controlling an infrared emission power based on a result of the detection.

With the portable radio terminal with an infrared communication function and the infrared emission power controlling method, there is an advantage that, upon communication over a very short distance, low power consumption in infrared communication can be achieved sufficiently, but upon normal infrared communication, infrared communication in a sufficient emission power condition can be performed.

According to a yet further aspect of the present invention, there is provided an infrared emission power controlling method between a portable radio terminal with an infrared communication function and an apparatus with an infrared communication function when a signal in an infrared frequency band is communicated between the portable radio terminal with an infrared communication function and the apparatus with an infrared communication function, comprising the steps performed by at least one of the portable radio terminal and the apparatus of detecting information of the other party of infrared communication, and controlling an infrared emission power based on a result of the detection.

With the infrared emission power controlling method, there is an advantage that infrared communication can be performed varying the infrared emission power depending upon the other party of infrared communication and, upon communication over a very short distance, the emission power can be suppressed, but communication over a long distance, a sufficient emission power can be outputted, and low power consumption can be achieved.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 2 is a block diagram showing a construction of a cradle according to the first embodiment of the present invention;

FIG. 3 is a block diagram showing a construction of a personal computer according to the first embodiment of the present invention;

DESCRIPTION OF THE PREFERRED EMBODIMENTS

A. First Embodiment of the Invention

Figure 1:
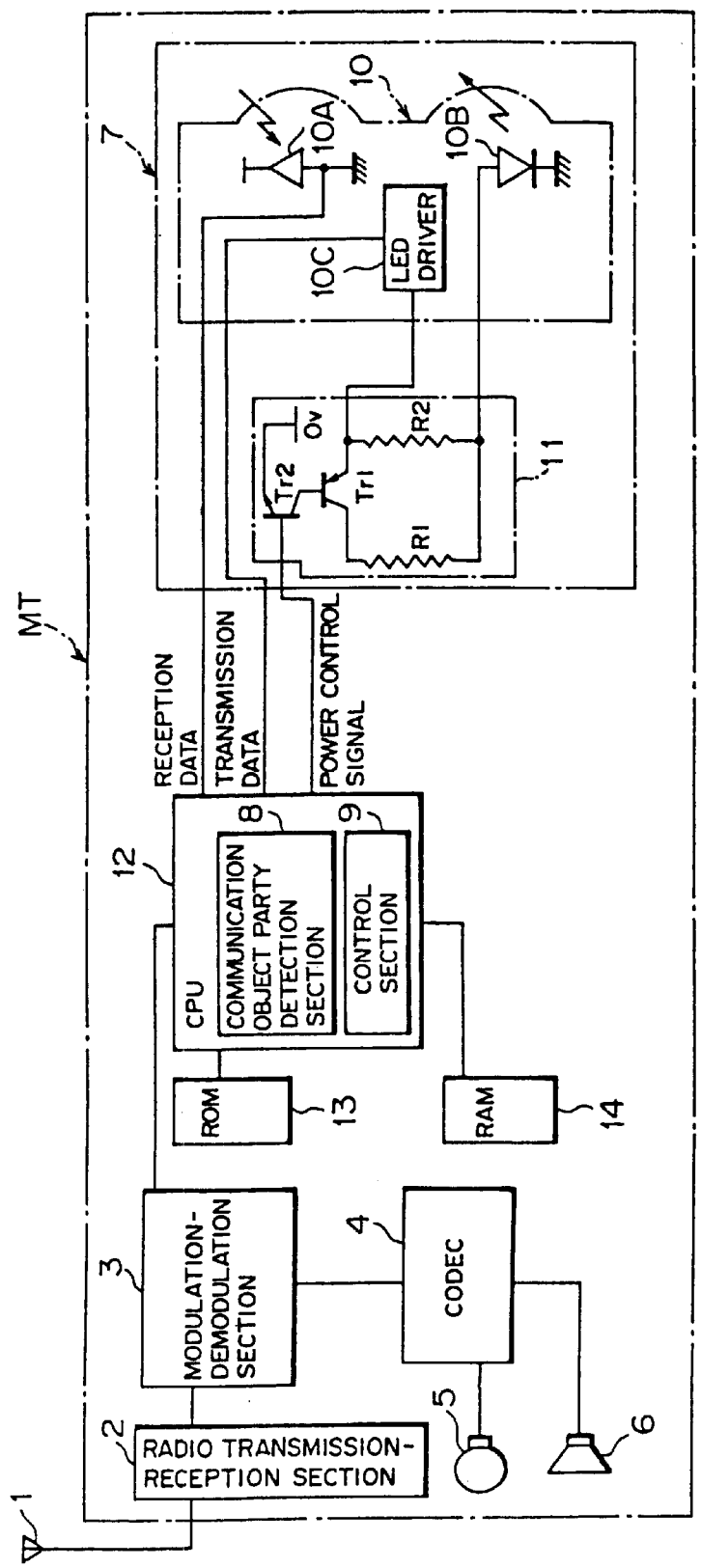
FIG. 1 is a block diagram showing a construction of a portable radio terminal with an infrared communication function according to a first embodiment of the present invention.

FIG. 1 is a block diagram showing a construction of a portable radio terminal with an infrared communication function according to a first embodiment of the present invention. Referring to FIG. 1, the portable radio terminal with an infrared communication function shown is generally denoted at MT and includes various components for providing an original radio communication function including an antenna 1, a radio transmission-reception section 2, a modulation-demodulation section 3, a coder-decoder (codec) 4, a microphone 5 and a speaker 6, and further includes an infrared communication section 7 serving as an infrared transmission-reception (or infrared ray transmission-reception) section, a communication object party detection section (communication object party detection means) 8, and a control section (control means) 9. It is to be noted that the portable radio terminal MT with an infrared communication function includes, as hardware components, a light emitting-receiving device unit 10, a variable resistance section 11, a CPU 12, a ROM 13, a RAM 14 and so forth in addition to the antenna 1, radio transmission-reception section 2, modulation-demodulation section 3, codec 4, microphone 5, speaker 6 and so forth mentioned above.

The antenna 1 is used for both of transmission and reception. The radio transmission-reception section 2 has a frequency conversion section such as an up-converter, a down-converter and so forth so that it performs frequency conversion between a radio frequency (RF) signal and an intermediate frequency (IF) signal. The modulation-demodulation section 3 performs modulation and demodulation processing. The codec 4 performs coding processing or decoding processing. The microphone 5 and the speaker 6 provide voice transmitting and receiving functions, respectively. Since all of the members mentioned here are known, further description is omitted herein.

The infrared communication section 7 transmits and receives a signal in a frequency band in an infrared region, and functions of the infrared communication section 7 are exhibited by the light emitting-receiving device unit 10 and the variable resistance section 11. The communication object party detection section 8 detects infrared communication object party information from data received from the other party of infrared communication through the infrared communication section 7. The control section 9 controls the emission power of the infrared communication section 7 in response to information of the other party of infrared communication detected by the communication object party detection section 8. Functions of the communication object party detection section 8 and the control section 9 are exhibited by the CPU 12, ROM 13, RAM 14 and so forth. Accordingly, the communication object party detection section 8 has a function also as an identification section which receives data from the other party of infrared communication through the infrared communication section 7 and identifies the other party of infrared communication from the received data.

The light emitting-receiving device unit 10 includes a light receiving device 10A such as a photodiode, a light emitting device 10B such as a light emitting diode (LED), a light emitting device driver circuit (LED driver) 10C and so forth.

Figure 9A:
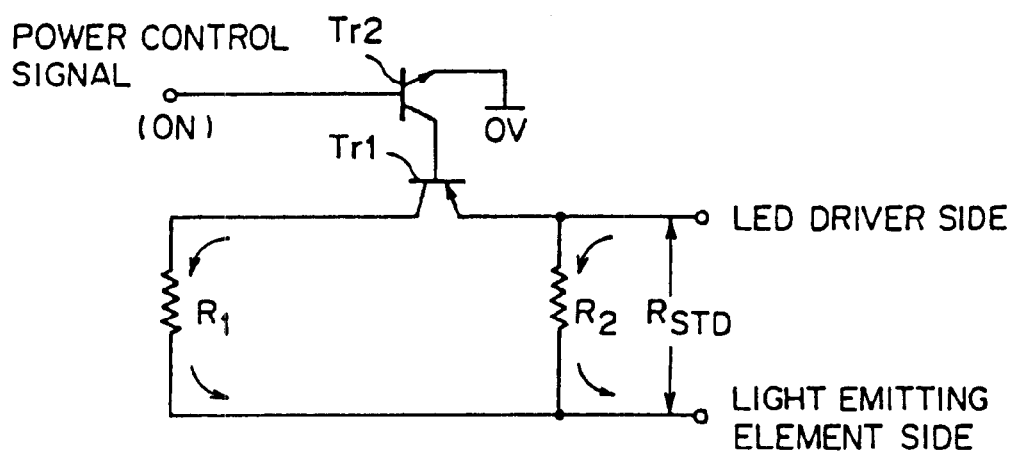
FIGS. 9(a) and 9(b) are circuit diagrams illustrating different operations of a variable resistance section employed in the first embodiment of the present invention.
Figure 9B:
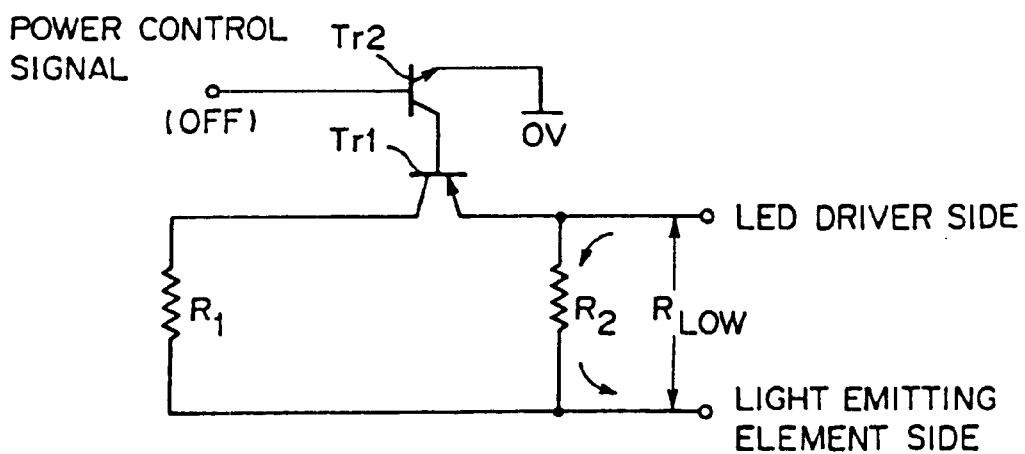

The variable resistance section 11 includes a pair of resistors R1 and R2 connected in parallel to each other, a pair of switching transistors Tr1 and Tr2 for switching the connection condition of the resistors R1 and R2, and so forth. If the switching transistors Tr1 and Tr2 are put into an on-state, then the resistors R1 and R2 are put into a parallelly connected condition and current flows through both of the resistors R1 and R2 as seen in FIG. 9(a). But if the switching transistors Tr1 and Tr2 are put into an off-state, then the resistor R1 is disconnected while only the resistor R2 remains in a connected condition and current flows only through the resistor R2 as seen in FIG. 9(b). Thus, it can be recognized that, since the resistance value $R_{STD}$ when the resistors R1 and R2 are in a parallelly connected condition is lower than the resistance value $R_{LOW}$ when only the resistor R2 is in a connected condition, higher driving current is supplied to the light emitting device 10B.

Consequently, the present portable radio terminal MT can perform radio communication using the elements which provide the original radio communication function including the antenna 1, radio transmission-reception section 2, modulation-demodulation section 3, codec 4, microphone 5, speaker 6 and so forth. Further, data (reception data) received by the light receiving device 10A of the light emitting-receiving device unit 10 of the infrared communication section 7 are fetched by the CPU 12, and information of the other party of infrared communication is detected from the reception data as the CPU 12 cooperates with the ROM 13, RAM 14 and so forth to function as the communication object party detection section 8. Further, as the CPU 12 cooperates with the ROM 13, RAM 14 and so forth to function as the control section 9, a power control signal in accordance with the information of the other party of infrared communication is outputted to the variable resistance section 11. Consequently, the driving signal to the light emitting device 10B is switched between two stages to control the emission power of the infrared communication section 7. On the other hand, transmission data are transmitted from the light emitting device 10B through the LED driver circuit 10C to the other party of infrared communication. Further, the communication object party detection section 8 detects information of the other party of infrared communication from data received from the other party of infrared communication through the infrared communication section 7.

Figure 4A:
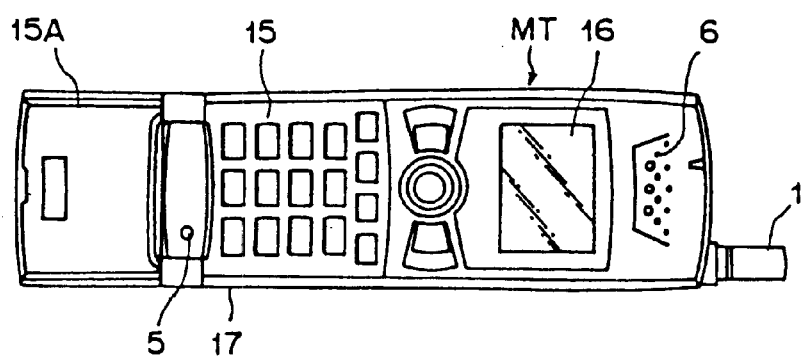
FIGS. 4(a) and 4(b) are a plan view and a side view, respectively, showing an appearance of the portable radio terminal with an infrared communication function according to the first embodiment of the present invention.
Figure 4B:
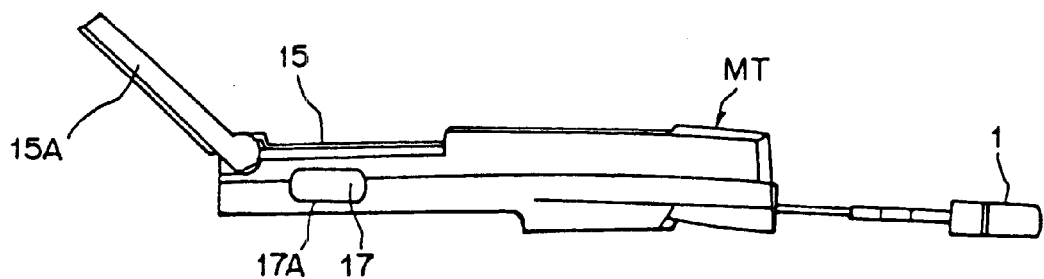

It is to be noted that the portable radio terminal MT with an infrared communication function has such an appearance as seen from FIGS. 4(a) and 4(b). In order to allow the original radio communication function to be exhibited, the present portable radio terminal MT has the antenna 1, an operating push-button set 15, a display unit 16 and so forth disposed thereon. It is to be noted that the operating push-button set 15 can be covered with a lid 15A. Further, a window 17 for allowing transmission and reception of infrared rays from and to the infrared communication section 7 therethrough is formed in a side wall of a terminal casing of the portable radio terminal MT. The window 17 is covered with an opaque infrared passing member 17A.

FIG. 2 is a block diagram showing a construction of a cradle which performs infrared communication with the present portable radio terminal with an infrared communication function and has a communication function by infrared rays. Referring to FIG. 2, the cradle shown is generally denoted at CD and includes a light receiving-emitting device unit 21, a CPU 22, a ROM 23, a RAM 24, a coder-decoder (codec) 25, a speaker 26, and a microphone jack 27.

The light receiving-emitting device unit 21 functions as an infrared communication section which transmits and receives a signal in an infrared frequency band to and from the portable radio terminal MT with an infrared communication function, and includes a light receiving device 21A such as a photodiode, a light emitting device 21B such as a light emitting diode (LED), a light emitting device drive circuit (LED driver) 21C, and so forth. A resistor R is interposed between the light emitting device 21B and the LED driver 21C and has a resistance value with which the light emitting device 21B can emit light with a low power suitable for communication over a very short distance of approximately 1 cm.

The speaker 26 is built in the cradle CD, and a microphone 28 is connected to the microphone jack 27 when it is to be used.

In the cradle CD, for example, speech data (reception data) from the portable radio terminal MT with an infrared communication function received by the light receiving device 21A of the light receiving-emitting device unit 21 are processed by the CPU 22, ROM 23, RAM 24 and so forth and then outputted from the speaker 26 through the codec 25. On the other hand, a speech signal from the microphone 28 is processed, after passing the codec 25, by the CPU 22, ROM 23, RAM 24 and so forth and transmitted as a transmission signal (transmission data) through the LED driver 21C from the light emitting device 21B to the portable radio terminal MT with an infrared communication function as the other party of communication.

Figure 5A:
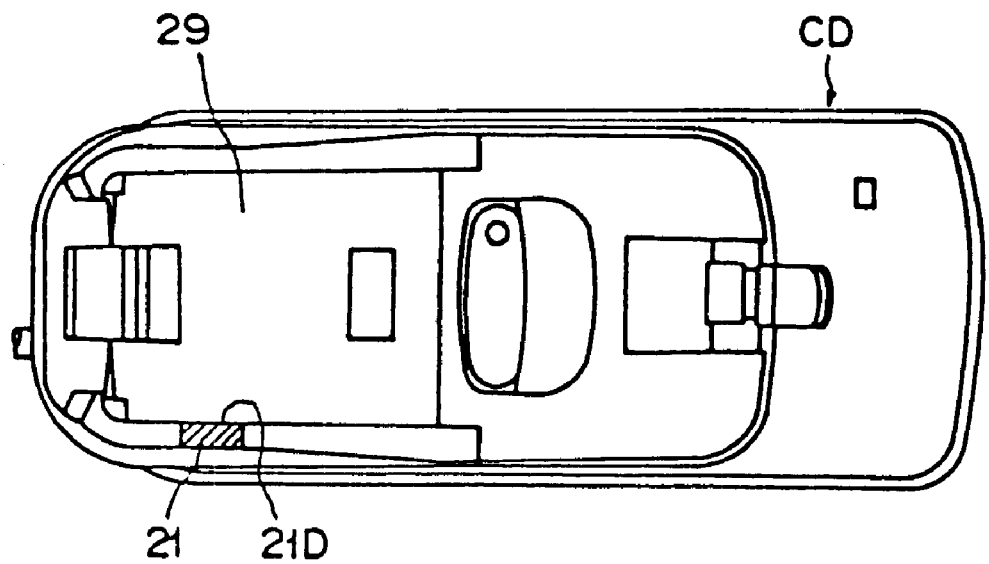
FIGS. 5(a) and 5(b) are a plan view and a side elevational view, respectively, showing an appearance of the cradle according to the first embodiment of the present invention.
Figure 5B:
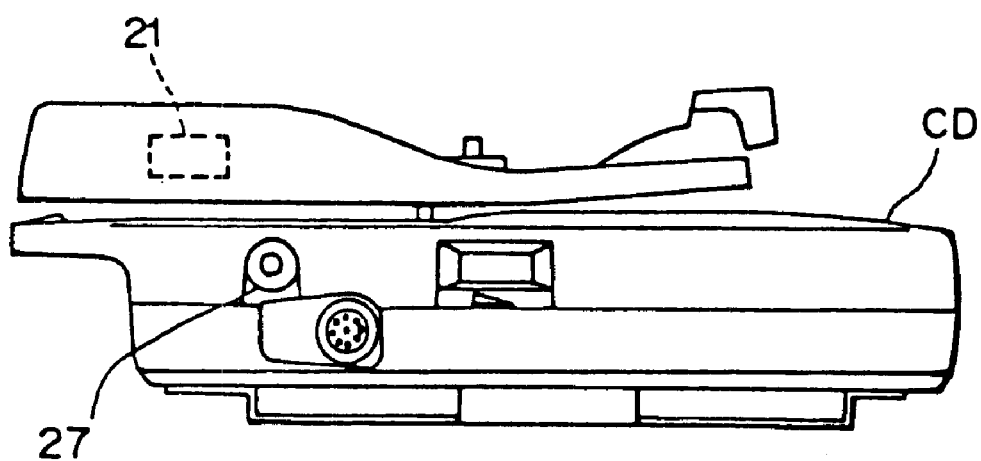

The cradle CD has such an appearance as seen in FIGS. 5(a) and 5(b). The cradle CD is a vehicle-carried adapter disposed at a suitable location in a cabin of an automobile and having a power supply function, a hand-free function, a communication function with a portable terminal and other necessary functions. The cradle CD has, on an upper face thereof, a terminal mounting portion 29 for receiving the portable radio terminal MT thereon, and a window 21D for allowing infrared rays to be transmitted from and received by the light receiving-emitting device unit 21 therethrough is formed at a location in the terminal mounting portion 29 which is to oppose the window 17 for transmission-reception of infrared rays of the portable radio terminal MT. Also the window 21D is covered with an opaque infrared passing member (not shown). The microphone jack 27 is provided on a side face portion of the cradle CD.

FIG. 3 is a block diagram showing a construction of a personal computer which performs infrared communication with the portable radio terminal MT with an infrared communication function and has a communication function by infrared rays. Referring to FIG. 3, the personal computer shown is generally denoted at PC and includes, in addition to components which provide original personal computer functions such as a CPU 30, a ROM 31, a RAM 32, a keyboard 33, a mouse 34, a display unit 35 and so forth, a light receiving-emitting device unit 36 and so forth.

The light receiving-emitting device unit 36 functions as an infrared communication section for transmitting and receiving a signal in an infrared frequency band to and from the portable radio terminal MT with an infrared communication function, and includes a light receiving device 36A such as a photodiode, a light emitting device 36B such as a light emitting diode (LED), a light emitting device drive circuit (LED driver) 36C, and so forth. A resistor R' having a resistance value with which the light emitting device 36B can emit light with a power suitable for communication over a distance of approximately 100 cm is interposed between the light emitting device 36B and the LED driver 36C.

The keyboard 33, mouse 34 and display unit 35 are connected to the personal computer PC through connectors 33A, 34A and 35A, respectively.

The personal computer PC having the construction described above exhibits original personal computer functions using the CPU 30, ROM 31, RAM 32, keyboard 33, mouse 34, display unit 35 and so forth. In addition, in the personal computer PC, for example, a data signal (reception data) from the portable radio terminal MT with an infrared communication function received by the light receiving device 36A of the light receiving-emitting device unit 36 is processed by the CPU 30, ROM 31, RAM 32 and so forth. On the other hand, data (transmission data) from the personal computer PC are processed by the CPU 30, ROM 31, RAM 32 and so forth and transmitted as a transmission signal (transmission data) through the LED driver 36C from the light emitting device 36B to the portable radio terminal MT with an infrared communication function as the other party of communication.

Figure 6:
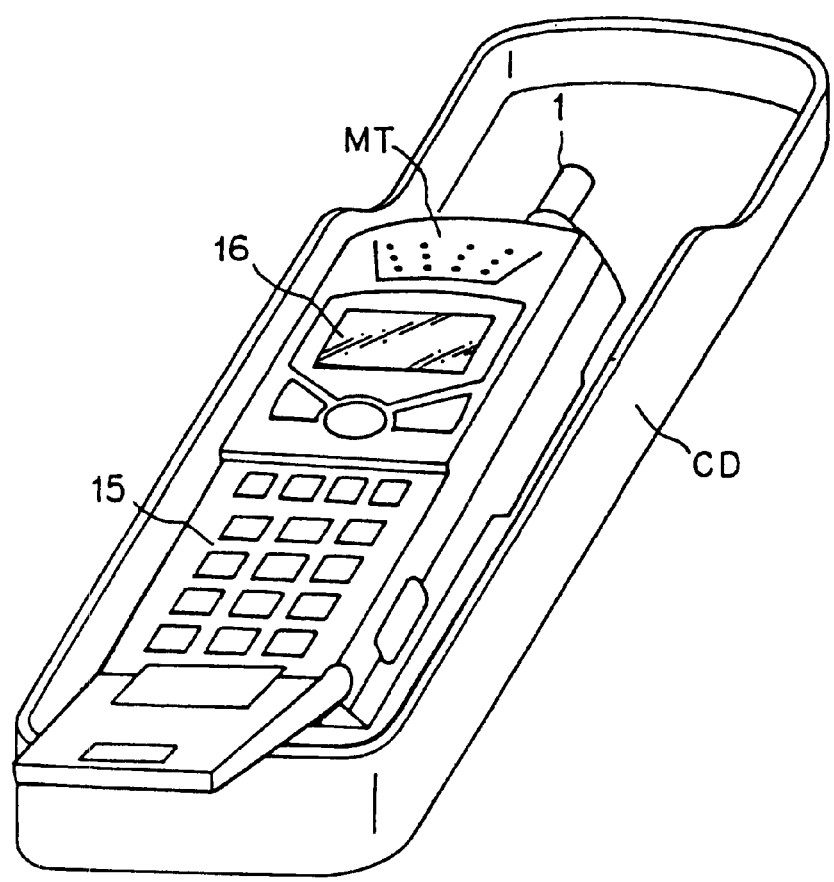
FIGS. 6 and 7 are a perspective view and a sectional view, respectively, schematically showing the portable radio terminal with an infrared communication function shown in FIGS. 4(a) and 4(b) when it is mounted on the cradle shown in FIGS. 5(a) and 5(b)
Figure 7:
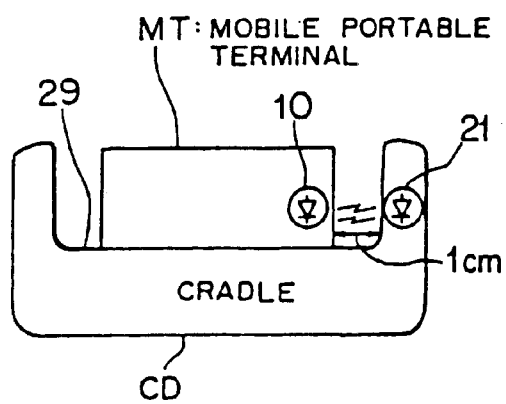
Figure 8:
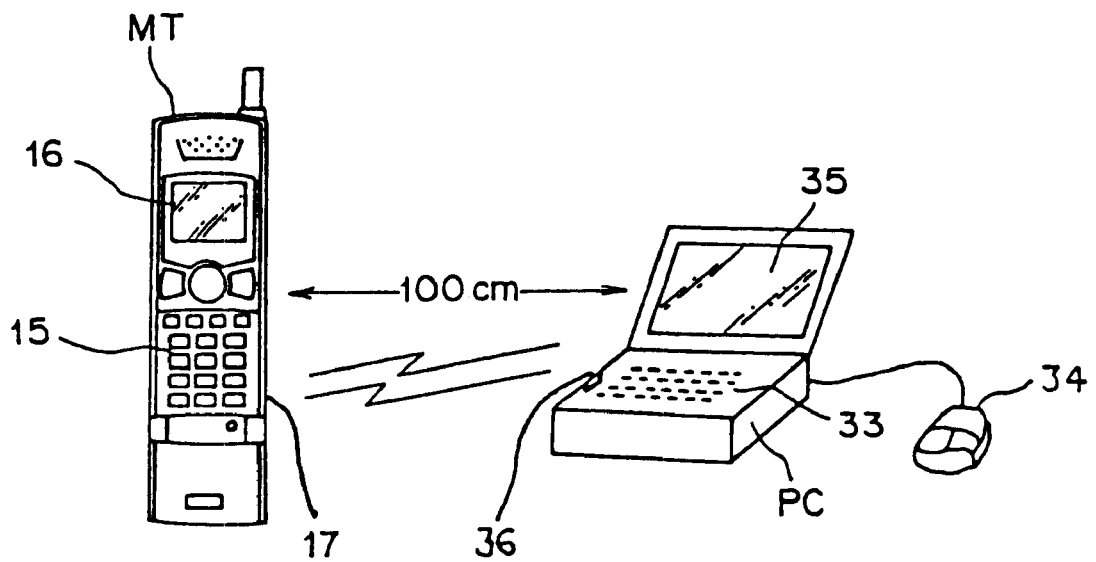
FIG. 8 is a schematic view showing the portable radio terminal with an infrared communication function and the personal computer according to the first embodiment of the present invention when they perform infrared communication.

The present portable radio terminal MT with an infrared communication function may be used in two different manners, i.e., to originate a telephone call in a hand-free condition while it is set on the cradle CD as seen in FIGS. 6 and 7 and to perform data communication with the personal computer PC as seen in FIG. 8.

Operation in the two cases is described below with reference to FIGS. 6 to 13.

First, operation when the portable radio terminal MT is used to originate a telephone call in a hand-free condition while it is set on the cradle CD as seen in FIGS. 6 and 7.

In this instance, the portable radio terminal MT is first set in position on the terminal mounting portion 29 of the cradle CD. Consequently, the window 17 for transmission-reception of infrared rays of the portable radio terminal MT and hence the light emitting-receiving device unit 10 and the window 21D for transmission-reception of infrared rays of the cradle CD and hence the light receiving-emitting device unit 21 oppose each other.

Figure 10:
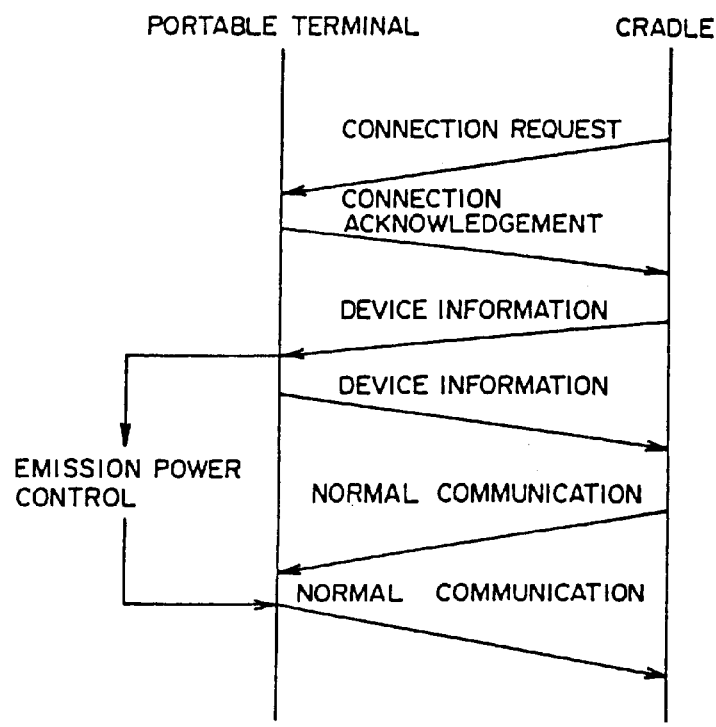
FIG. 10 is a signal sequence diagram illustrating a connection procedure between the portable radio terminal with an infrared communication function and the cradle in the first embodiment of the present invention.

In this condition, a connection request is issued from the cradle CD side as seen from FIG. 10. Receiving the connection request, the portable radio terminal MT sends back a connection acknowledgement. Thereafter, device information is transmitted from the cradle CD to the portable radio terminal MT and vice versa. From data received through the communication, the communication object party detection section 8 in the portable radio terminal MT discriminates that the other party of communication is the cradle CD, and the control section 9 outputs to the variable resistance section 11 a power control signal to use a low power consumption corresponding to the cradle CD. More particularly, the control section 9 outputs a signal to turn the switching transistors Tr1 and Tr2 off so that the resistor R1 is disconnected and current flows only through the resistor R2. Consequently, low current for the cradle CD flows through the light emitting device 10B. Further, the portable radio terminal MT can be placed on and used with the cradle CD (vehicle-carried adapter) having a communication function by infrared rays, and in the portable radio terminal MT, the infrared communication section 7 transmits and receives a signal in an infrared frequency band and the communication object party detection section (identification section) 8 identifies the other party of infrared communication and then, when the communication object party detection section (identification section) 8 detects that the other party of communication is the cradle CD (vehicle-carried adapter), the control section 9 controls the light emission power of the infrared communication section 7 lower than a normal light emission power.

In this manner, in a condition wherein the portable radio terminal MT is set on the cradle CD, infrared communication is performed in a suppressed optical power condition, and as a result, low power consumption in infrared communication can be achieved.

Now, operation when the portable radio terminal MT is used to perform data communication with the personal computer PC as seen from FIG. 8.

In this instance, a different controlling method is used. First, the portable radio terminal MT is placed at a distance from the personal computer PC within a range of, for example, approximately 100 cm, such that the window 17 for transmission-reception of infrared rays of the portable radio terminal MT and hence the light emitting-receiving device unit 10 and the light receiving-emitting device unit 36 of the personal computer PC may oppose each other.

Figure 11:
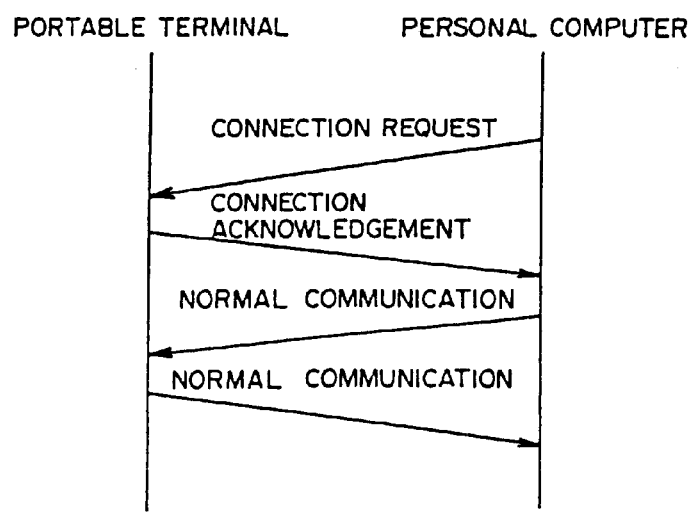
FIG. 11 is a similar view but illustrating a connection procedure between the portable radio terminal with an infrared communication function and the personal computer in the first embodiment of the present invention.

In this condition, a connection request is issued from the personal computer PC side as seen from FIG. 11. Receiving the connection request, the portable radio terminal MT returns a connection acknowledgement. Thereafter, since no communication of device information is performed between them, the communication object party detection section 8 of the portable radio terminal MT recognizes from received data that the other party of communication is not the cradle CD, and the control section 9 outputs a power control signal to the variable resistance section 11 to use a power consumption suitable for an apparatus (in the present example, the personal computer PC) which is not the cradle CD (that is, a power consumption with which infrared communication can be performed with certainty over a distance approximately 100 cm). More particularly, the control section 9 outputs a signal to turn on the switching transistors Tr1 and Tr2 so that current may flow through both of the resistors R1 and R2 as described hereinabove with reference to FIGS. 9(a) and 9(b). Consequently, high current which is not for the cradle CD flows through the light emitting device 10B. In this condition, infrared communication is performed in a sufficiently high light emission power condition in this matter.

Accordingly, with the present infrared emission power controlling method between a portable radio terminal and an apparatus with an infrared communication function described above, when a signal in an infrared frequency band is communicated between the portable radio terminal MT with an infrared communication function and an apparatus with an infrared communication function (the cradle CD or the personal computer PC), the portable radio terminal MT detects information of the other party of infrared communication and controls the infrared emission power based on a result of the detection.

Figure 12:
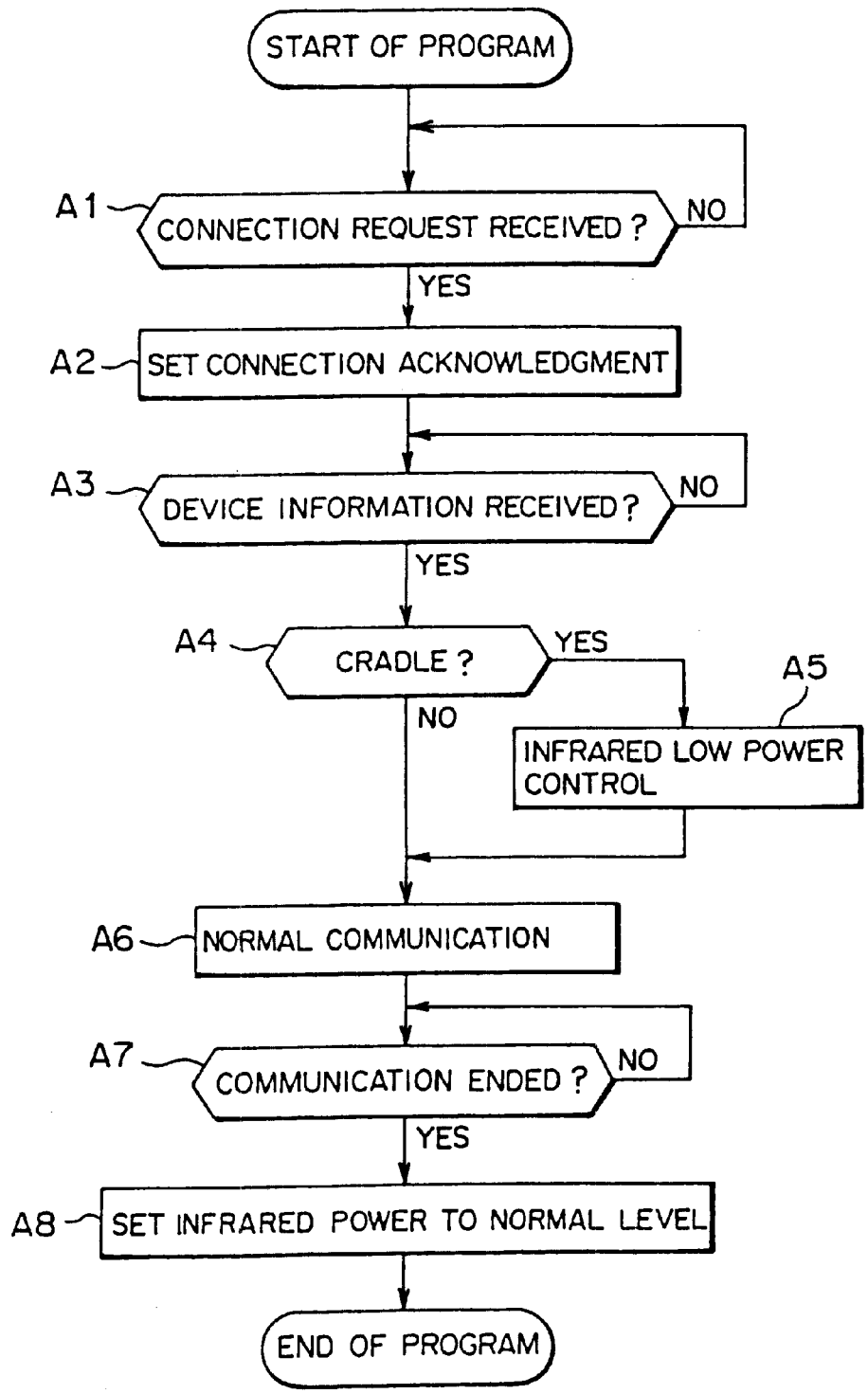
FIG. 12 is a flow chart illustrating an outline of control of the portable radio terminal with an infrared communication function according to the first embodiment of the present invention.

An outline of control by the portable radio terminal MT side including the various manners of use described above is illustrated in FIG. 12. Referring to FIG. 12, the portable radio terminal MT confirms in step A1 whether or not a connection request has been received. If the portable radio terminal MT has received a connection request, then the YES route of step A1 is taken, and in step A2, a connection acknowledgement is set and sent back to the other party of communication. It is to be noted that, if no connection request has been received, then the present portable radio terminal MT waits until a connection request is received (the NO route of step A1). Then, after step A2, the portable radio terminal MT waits for reception of device information (the NO route of step A3), and if it receives device information (the YES route of step A3) and this is the cradle CD, then the YES route of step A4 is taken and infrared low power control is executed in step A5.

Consequently, the portable radio terminal MT can perform infrared communication in a suppressed emission power condition, and as a result, low power consumption in infrared communication can be achieved.

Thereafter, the portable radio terminal MT performs normal communication in step A6 and supervises whether or not the communication comes to an end (the NO route of step A7). Then, if the communication comes to an end, then the YES route of step A7 is taken and the infrared emission power is returned to its normal set level in step A8.

On the other hand, if the device information received in step A4 does not represent the cradle CD (represents, for example, a personal computer), then the portable radio terminal MT takes the NO route of step A4 and performs normal communication in step A6. In any of the conditions described above, infrared communication in a sufficiently high emission power condition is performed, but infrared low power control is not preformed.

In this manner, in a condition wherein the portable radio terminal MT is set on the cradle CD, the portable radio terminal MT can perform infrared communication in a suppressed emission power condition by recognizing the cradle CD as the other party of infrared communication. As a result, low power consumption in infrared communication can be achieved, and besides, upon infrared communication with the personal computer PC, infrared communication in a sufficiently high emission power condition can be achieved.

Figure 13:
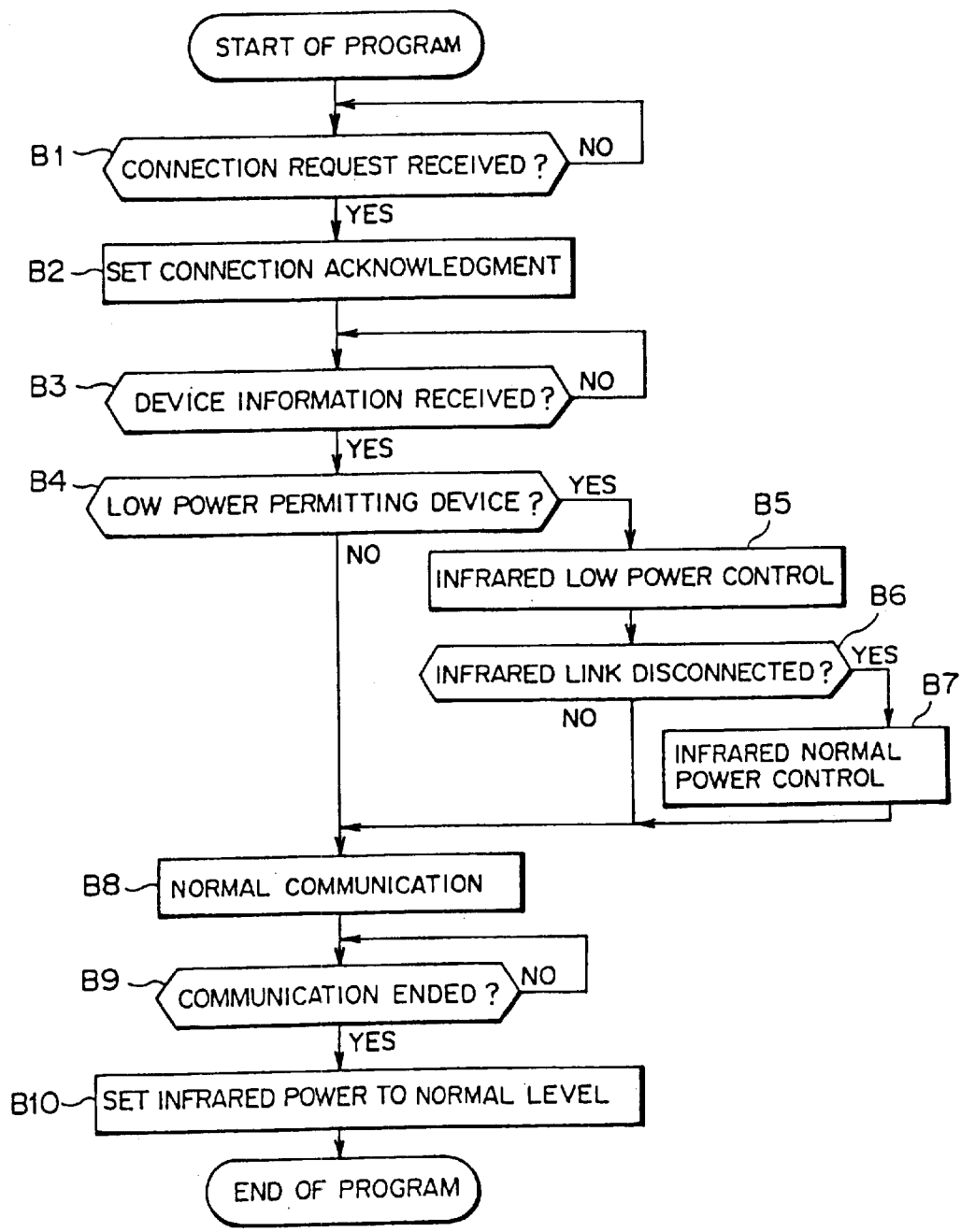
FIG. 13 is a flow chart illustrating an outline of another control of the portable radio terminal with an infrared communication function according to the first embodiment of the present invention.

An outline of another control by the portable radio terminal MT side including the various manners of use described above is illustrated in FIG. 13. Referring to FIG. 13, the portable radio terminal MT confirms in step B1 whether or not a connection request has been received. If a connection request has been received, then the YES route of step B1 is taken, and in step B2, a connection acknowledgement is set and sent back to the other party of communication. It is to be noted that, if no connection request has been received, then the portable radio terminal MT waits until it receives a connection request (the NO route of step B1). After step B2, the portable radio terminal MT waits for reception of device information (the NO route of step B3). Then, when it receives device information, the YES route of step B3 is taken, and it is discriminated in step B4 whether the other party of infrared communication is the cradle CD or the personal computer PC.

If it is discriminated from the device information that the other party of infrared communication is the cradle CD which is a low power permitting device, then the YES route of step B4 is taken, and in step B5, the portable radio terminal MT performs infrared low power control. Then, in step B6, the portable radio terminal MT supervises whether or not disconnection of the infrared link has occurred. If the infrared link has been disconnected, then the portable radio terminal MT returns the infrared emission power to its normal set level in step B7. Naturally, however, if no disconnection of the infrared link has occurred (the NO route of step B6), then the portable radio terminal MT continues the infrared low power control. As a result, the portable radio terminal MT can achieve low power consumption in infrared communication.

Thereafter, the portable radio terminal MT performs normal communication in step B8 and then supervises whether or not the communication comes to an end (the NO route of the step B9). When the communication comes to an end, the portable radio terminal MT takes the YES route of step B9 and returns the infrared emission power to its normal set one [a set value for communication with a normal equipment (for example, the personal computer PC) other than a low power permitting device] in step B10.

On the other hand, if the other party of communication to the portable radio terminal MT is not a low power permitting device in step B4, then the NO route is taken, and the portable radio terminal MT performs normal communication.

Also by the procedure described above, low power consumption in infrared communication can be achieved in a condition wherein the portable radio terminal MT is set on the cradle CD, and besides, upon infrared communication with the personal computer PC, infrared communication in a sufficiently high emission power condition can be performed.

A1. Modification to the First Embodiment of the Invention

While, in the first embodiment described above, information of the other party of infrared communication to the portable radio terminal MT is obtained as reception data by the infrared communication means, such information can be detected also by another method. In this instance, in a condition wherein the portable radio terminal MT is set on the cradle CD, a cradle connection detection terminal of the portable radio terminal MT is connected to a terminal of the cradle CD, and through the connection, the portable radio terminal MT detects that the other party of infrared communication is the cradle CD.

Figure 14:
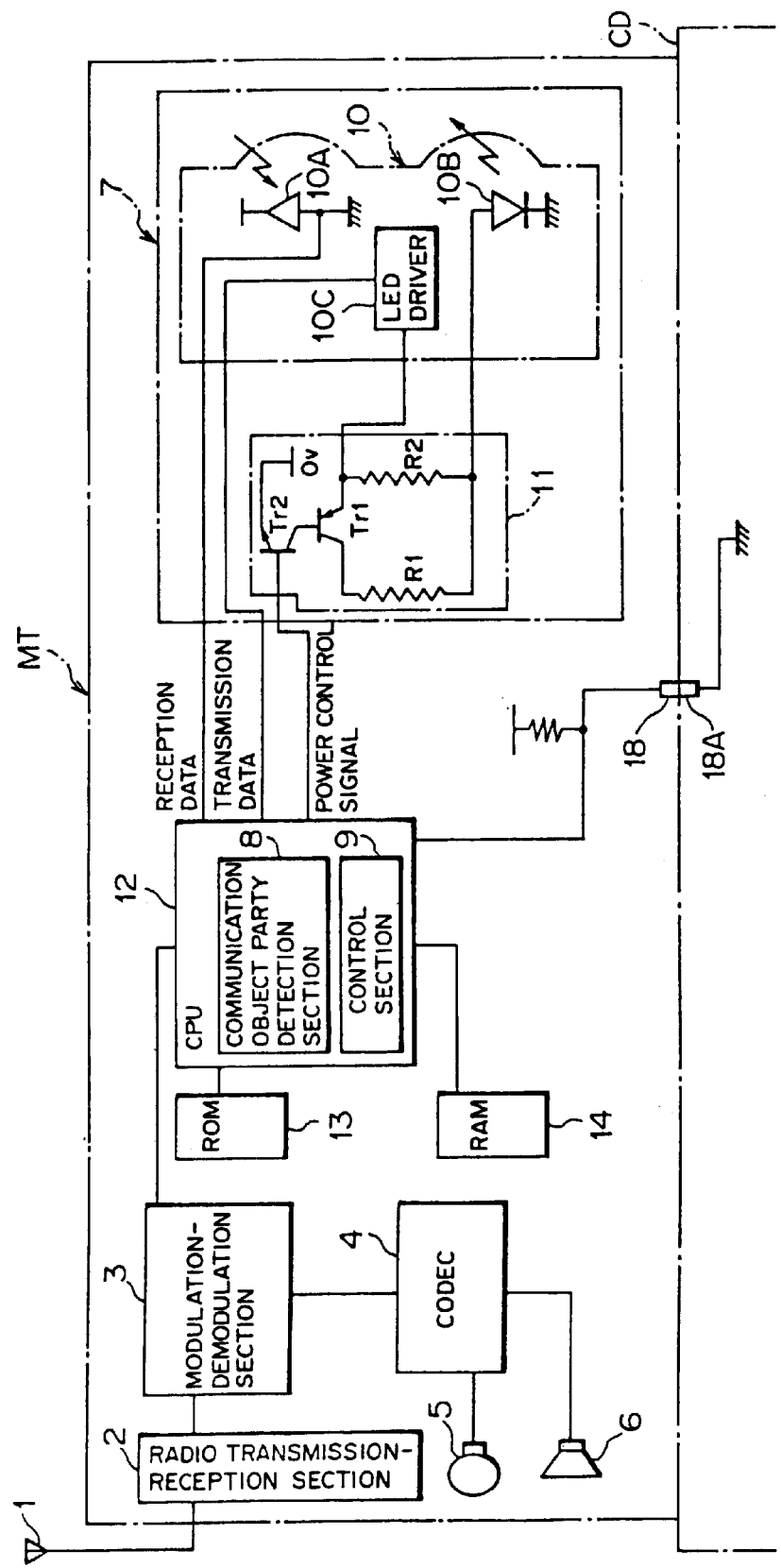
FIG. 14 is a block diagram showing a construction of a portable radio terminal with an infrared communication function according to a modification to the first embodiment of the present invention.

In particular, in this instance, the portable radio terminal MT is provided with a cradle connection detection terminal 18 as a predetermined external terminal as shown in FIG. 14, and identification of whether or not the cradle connection detection terminal 18 is connected to a cradle terminal 18A of the cradle CD is performed by the communication object party detection section 8 which is composed of the CPU 12 and so forth. This identification method is possible since, when the cradle connection detection terminal 18 and the cradle terminal 18A are connected to each other, the cradle connection detection terminal 18 exhibits a low level, but when the cradle connection detection terminal 18 and the cradle terminal 18A are not connected to each other, the cradle connection detection terminal 18 exhibits a high level. In other words, the cradle connection detection terminal 18 functions as an identification section.

Further, the portable radio terminal MT which is placed on and can be used with the cradle CD (vehicle-carried adapter) having a communication function by infrared rays includes an infrared communication section 7 for transmitting and receiving a signal in an infrared frequency band, an identification section (the cradle connection detection terminal 18) for identifying the other party of infrared communication, and a control section 9 for decreasing the emission power of the infrared communication section 7 from its normal emission power when the identification section detects that the other party of infrared communication is the cradle CD.

Accordingly, when the portable radio terminal MT is to be set on the cradle CD as shown in FIGS. 6 and 7 and used to originate a telephone call in a hand-free condition, since the cradle connection detection terminal 18 and the cradle terminal 18A are not connected to each other as the portable radio terminal MT is set in position onto the terminal mounting portion 29 of the cradle CD, the communication object party detection section 8 of the portable radio terminal MT discriminates that the other party of communication is not the cradle CD, and the control section 9 outputs a power control signal to the variable resistance section 11 so that a low power consumption suitable for the cradle CD may be used. Also in this instance, particularly the control section 9 outputs a signal to turn off the switching transistors Tr1 and Tr2 to disconnect the resistor R1 while current flows only through the resistor R2 as described hereinabove with reference to FIGS. 9(*a*) and 9(*b*). Consequently, low current for the cradle CD flows through the light emitting device 10B. Accordingly, in a condition wherein the portable radio terminal MT is set on the cradle CD, infrared communication is performed in a suppressed emission power condition. As a result, low power consumption in infrared communication can be achieved.

On the other hand, where the portable radio terminal MT is used to perform data communication with the personal computer PC as seen in FIG. 8, since the cradle connection detection terminal 18 and the cradle terminal 18A are not connected to each other, the communication object party detection section 8 of the portable radio terminal MT discriminates that the other party of communication is not the cradle CD, and the control section 9 outputs a power control signal to the variable resistance section 11 so that a power consumption suitable for an apparatus (in this instance, the personal computer PC) which is not the cradle CD may be used. In other words, the communication object party detection section 8 detects infrared communication object party information from the connection condition of the predetermined external terminal. Then, the portable radio terminal MT sets the emission power output to its normal set level so that infrared communication over a distance of 100 cm with the personal computer PC may be performed with certainty. Also in this instance, particularly the control section 9 outputs a signal to turn on the switching transistors Tr1 and Tr2 so that current may flow through both of the resistors R1 and R2 as described hereinabove with reference to FIGS. 9(*a*) and 9(*b*). Consequently, high current which is not for the cradle CD flows through the light emitting device 10B, and in this condition, infrared communication in a sufficiently high emission power condition is performed.

Also an outline of control by the portable radio terminal MT side in this instance is such as illustrated in FIGS. 12 and 13. However, in place of the discrimination regarding reception of device information which is performed in step A3 of FIG. 12 and step B3 of FIG. 13, the other party of communication is detected from the connection condition of the cradle connection detection terminal 18 and on/off of execution of low power control is performed.

In particular, in the present portable radio terminal MT, the other party of communication is detected from the connection condition of the cradle connection detection terminal 18 and it is recognized whether the other party of communication is the cradle CD or the personal computer PC. Then, the portable radio terminal MT waits until a connection request is received (the NO route of step B1), and when a connection request is received (the YES route of step B1), the portable radio terminal MT performs setting of a connection acknowledgement in step B2. Then, in step B4 after bypassing step B3, the YES route is taken. On the other hand, if the other party of communication is the personal computer PC, then the NO route is taken, and the portable radio terminal MT performs normal communication in and after step B8.

In this manner, the portable radio terminal MT identifies, by the communication object party detection means, the other party of communication through the cradle connection terminal and can perform power control suitable for the thus identified apparatus, thereby achieving low power consumption.

B. Second Embodiment of the Invention

A portable radio terminal MT according to the present invention detects the other party of infrared communication and, if the other party of infrared communication is a personal computer PC, then it can control its emission power in accordance with a communication distance to the personal computer PC. In particular, if the portable radio terminal MT is placed on a cradle CD, then the emission power is controlled to a low level, but when the portable radio terminal MT is used to perform infrared communication with the personal computer PC, if the communication distance to it is approximately 100 cm, then infrared emission power is outputted with an initial value (maximum valve) by a normal setting, but if the communication distance is smaller than 100 cm, then control is performed so that the emission power is decreased in accordance with the communication distance.

It is to be noted that, in order to perform such control, it is presumed that the portable radio terminal MT and the personal computer PC normally output an infrared emission power sufficient to allow communication over approximately 100 cm. For the following description, five values $P_{MTR}$, $P_{MTS}$, $P_{PCR}$, $P_{PCS}$ and $P_{CDS}$ are defined: $P_{MTR}$ represents a reception light power value detected by the portable radio terminal MT; $P_{MTS}$ represents an emission power value when the portable radio terminal MT transmits; $P_{PCR}$ represents a reception light power value detected by the personal computer PC; $P_{PCS}$ represents an emission power value when the personal computer PC transmits; and $P_{CDS}$ represents an emission power value when the cradle CD transmits.

Figure 15:
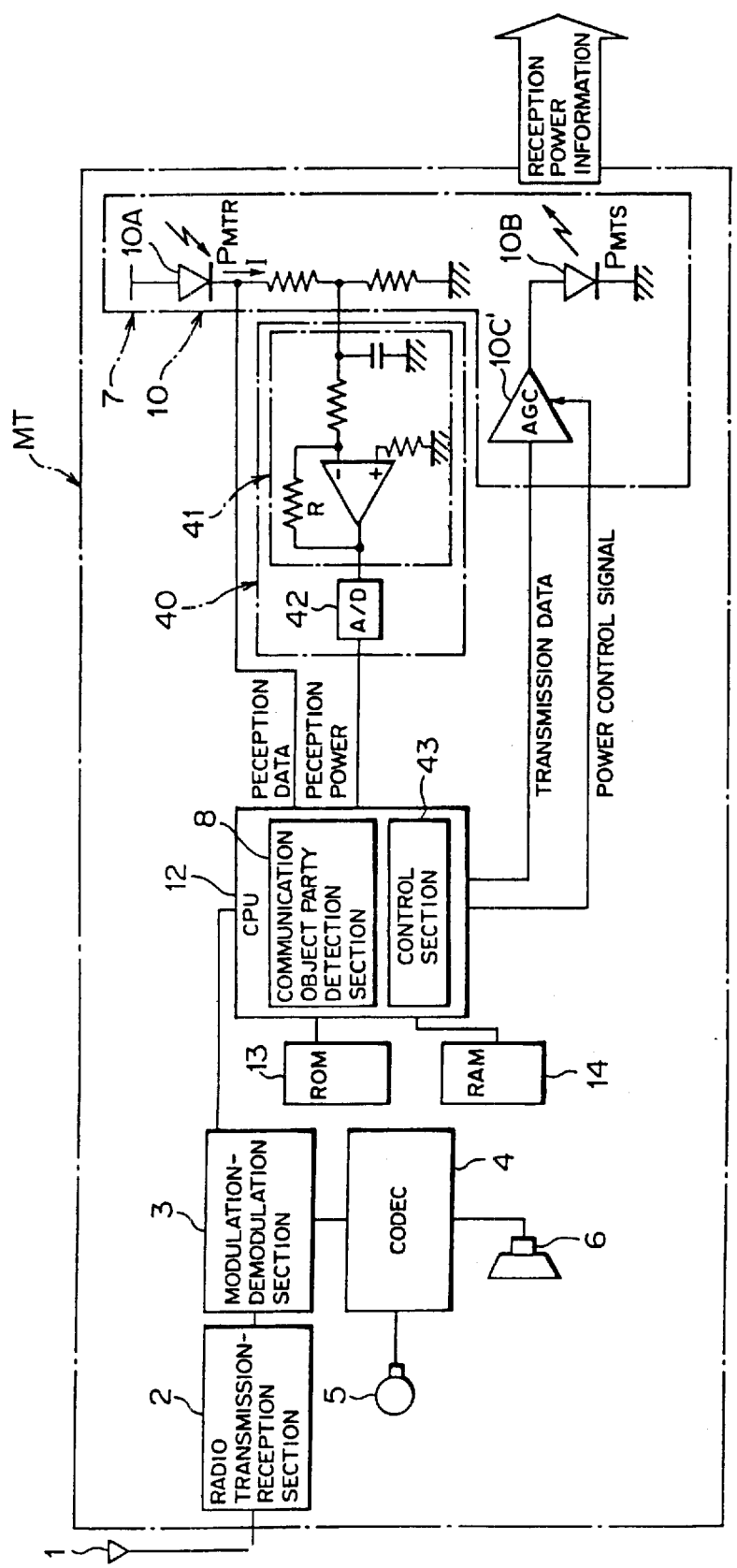
FIG. 15 is a block diagram showing a construction of a portable radio terminal with an infrared communication function according to a second embodiment of the present invention.

FIG. 15 is a block diagram showing a construction of the portable radio terminal with an infrared communication function according to the second embodiment of the present invention. Referring to FIG. 15, also the present portable radio terminal MT with an infrared communication function includes components which present an normal radio communication function including an antenna 1, a radio transmission-reception section 2, a modulation-demodulation section 3, a codec 4, a microphone 5, a speaker 6 and so forth similarly as in the first embodiment described above, and further includes components which provide an infrared communication function including an infrared communication section 7, a communication object party detection section 8, a reception power detection section (reception power detection means) 40, a control section (control means) 43 and so forth.

It is to be noted that, as hardware components, the present portable radio terminal MT includes, in addition to the antenna 1, radio transmission-reception section 2, modulation-demodulation section 3, codec 4, microphone 5, speaker 6 and so forth mentioned above, a light emitting-receiving device unit 10, an amplification section 41, an analog to digital conversion section (A/D conversion section) 42, a CPU 12, a ROM 13, a RAM 14 and so forth. Also the appearance of the portable radio terminal MT according to the present second embodiment is such as seen from FIGS. 4(*a*) and 4(*b*) similarly to that according to the first embodiment described above.

The infrared communication section 7 transmits and receives a signal in an infrared frequency band, and this function is exhibited by the light emitting-receiving device unit 10. The communication object party detection section 8 detects infrared communication object party information (the personal computer PC or the cradle CD) from data received from the other party of infrared communication through the infrared communication section 7, and this function is exhibited by the CPU 12, ROM 13, RAM 14 and so forth.

The reception power detection section 40 detects a reception power $P_{MTR}$ (reception power value detected by the portable radio terminal MT) spaced by a required distance from the other party of infrared communication, and the function of the reception power detection section 40 is exhibited by the amplification section 41 and the A/D conversion section 42.

The control section 43 controls the emission power of the infrared communication section 7 using the reception power information $P_{MTR}$ detected by the reception power detection section 40 and the infrared communication object party information detected by the communication object party detection section 8. When the other party of communication detected by the communication object party detection section 8 is the cradle CD, the control section 43 decreases an emission power $P_{MTS}$ (emission power value when the portable radio terminal MT transmits), but when the other party of communication is the personal computer PC or the like, the control section 43 controls the emission power $P_{MTS}$ of the infrared communication section 7 in response to the reception power $P_{MTR}$ detected by the reception power detection section 40. This function of the control section 43 is exhibited by the CPU 12, ROM 13, RAM 14 and so forth. Here, the emission power control of the control section 43 when the other party of communication is the personal computer PC or the like is performed in the flowing manner.

In particular, the portable radio terminal MT compares the reception power $P_{MTR}$ detected by the reception power detection section 40 and a required reference value $P_{REF-MT}$ with each other, and controls the emission power $P_{MTS}$ of the infrared communication section 7 in accordance with a difference between the reception power $P_{MTR}$ and the reference value $P_{REF-MT}$ and transmits the reception power information $P_{MTR}$ as transmission data to the other party of infrared communication (for example, the personal computer PC). It is to be noted that, to the reference value $P_{REF-MT}$, a value corresponding to a minimum reception light power value with which infrared communication can be performed appropriately is set. Further, a control signal is outputted from the CPU 12 to a light emitting device driver circuit (AGC type LED driver) 10C' of the automatic gain control (AGC) type in response to a voltage value at the output of the A/D conversion section 42 of the reception power detection section 40 so that the emission power $P_{MTS}$ can be controlled with a continuous value.

The light emitting-receiving device unit 10 includes, in addition to a light receiving device 10A such as a photodiode and a light emitting device 10B such as a light emitting diode (LED), the light emitting device driver circuit (AGC type LED driver) 10C' of the automatic gain control (AGC) type, and so forth. Accordingly, the driving current to the light emitting device 10B can be varied continuously to control the emission power $P_{MTS}$ of the light emitting device 10B, and the emission power $P_{MTS}$ of the light emitting device can be controlled not by such two-stage control of the high and low levels by turning on and off of transistors as described above with reference to FIGS. 9(a) and 9(b), but by continuous and fine control.

Consequently, the present portable radio terminal MT not only can perform radio communication using the components which provide the original radio communication function including the antenna 1, radio transmission-reception section 2, modulation-demodulation section 3, codec 4, microphone 5, speaker 6 and so forth similarly as in the first embodiment, but also can detect, by the communication object party detection section 8 thereof, the other party of communication from reception data at the output of the light receiving device 10A of the light emitting-receiving device unit 10 of the infrared communication section 7 and detect, by the reception power detection section 40 thereof, the reception power information $P_{MTR}$ of light sent from the other party of infrared communication. In particular, the reception data from the light receiving device 10A are inputted to the CPU 12, and as the CPU 12, ROM 13, RAM 14 and so forth function as the communication object party detection section 8, the other party of infrared communication is detected. Then, when the other party of infrared communication is the cradle CD, the CPU 12 outputs a power control signal (low power) to the LED driver 10C' of the AGC type to decrease the gain of the LED driver 10C' of the AGC type to reduce the driving current to the light emitting device 10B so that the emission power $P_{MTS}$ of the infrared communication section 7 is controlled to a low output for the communication distance of 1 cm.

On the other hand, when the other party of infrared communication is the personal computer PC, the value of current flowing through the light receiving device 10A of the light emitting-receiving device unit 10 is converted into a voltage value by the amplification section 41 and further converted into a digital value by the A/D conversion section 42, whereafter it is inputted to the CPU 12. Then, as the CPU 12 and the ROM 13 and RAM 14 function as the control section 43, a power control signal in accordance with the reception power $P_{MTR}$ of light sent from the other party of infrared light is outputted to the LED driver 10C' of the AGC type to vary the gain of the same so that the driving current to the light emitting device 10B is continuously varied to control the emission power $P_{MTS}$ of the infrared communication section 7. Further, transmission data are transmitted through the LED driver 10C' from the light emitting device 10B to the other party of communication, and also the detected emission power $P_{MTS}$ is sent out to the other party of infrared communication.

Accordingly, in order to communicate a signal in an infrared frequency band between the portable radio terminal MT and the personal computer PC, a method is taken wherein the portable radio terminal MT uses the emission power $P_{MTS}$ from the other party of infrared communication and the infrared communication object party information detected by the communication object party detection section 8 to control the infrared emission power $P_{MTS}$.

Figure 16:
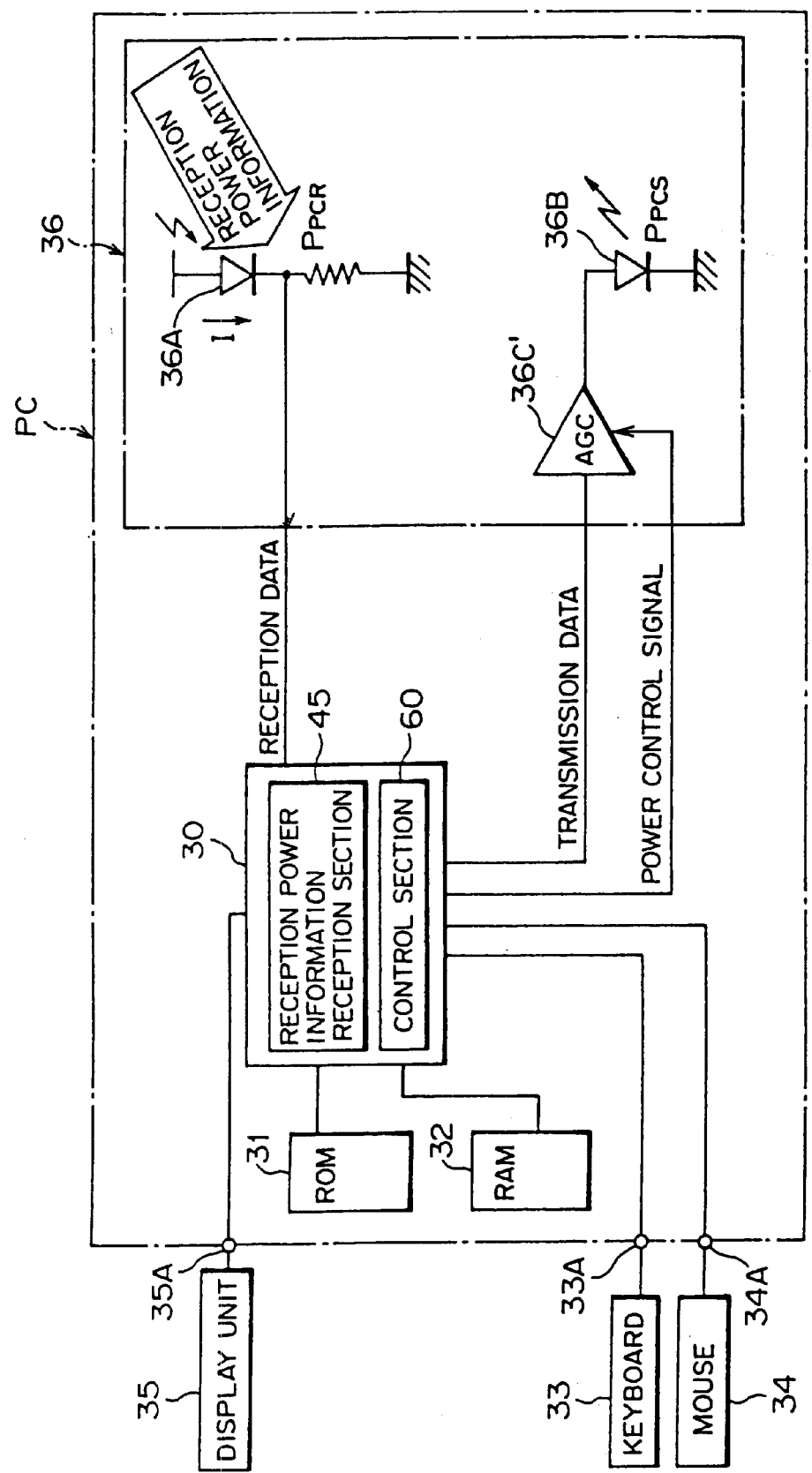
FIG. 16 is a block diagram showing a construction of a personal computer according to the second embodiment of the present invention.

FIG. 16 is a block diagram showing a construction of the personal computer PC which performs infrared communication with the present portable radio terminal MT with an infrared communication function and has a communication function by infrared rays. Referring to FIG. 16, the personal computer PC shown includes components which provide original personal computer functions including a CPU 30, a ROM 31, a RAM 32, a keyboard 33, a mouse 34, a display unit 35 and so forth. However, the present personal computer PC is different from that of the first embodiment described above in construction of a light receiving-emitting device unit 36 which functions as an infrared communication section which transmits and receives a signal in an infrared frequency band to and from the portable radio terminal MT.

In particular, the light receiving-emitting device unit 36 includes, in addition to a light receiving device 36A such as a photodiode and a light emitting device 36B such as a light emitting diode (LED), a light emitting device driver circuit (AGC type LED driver) 36C' of the automatic gain control (AGC), and so forth. Accordingly, the driving current to the light emitting device 36B can be varied continuously to control an emission power $P_{PCS}$ of the light emitting device 36B.

Further, the personal computer PC has a function of a reception power information reception section (reception power information reception means) 45 for receiving (extracting) reception power information $P_{MTR}$ (which has a correlation to the emission power value $P_{PCS}$ of the personal computer PC) detected by and sent back from the portable radio terminal MT and obtained through the light receiving device 36A, and a function of a control section 60 for controlling the emission power $P_{PCS}$ of the light emitting device 36B in response to the reception power information $P_{MTR}$ received by the reception power information reception section 45. The functions just mentioned are exhibited by the CPU 30, ROM 31 and RAM 32.

In particular, the emission power value $P_{PCS}$ when the personal computer PC transmits is detected as a reception power value $P_{MTR}$ by the portable radio terminal MT located at a predetermined communication distance. Since the reception power value $P_{MTR}$ of the portable radio terminal MT has a correction to the emission power value $P_{PCS}$ of the personal computer PC, as the reception power value $P_{MTR}$ is sent back from the portable radio terminal MT to the personal computer PC, the personal computer PC can vary the emission power value thereof from $P_{PCS}$ to $P_{PCS-NEW}$. In this instance, when reception data from the light receiving device 36A of the personal computer PC of FIG. 16 are inputted to the CPU 30, the reception power information reception section 45 extracts the reception power information $P_{MTR}$ from the data, and the control section 60 controls the emission power $P_{PCS}$ of the light emitting device 36B based on the thus extracted reception power $P_{MTR}$.

The emission power control of the control section 60 is performed in the following manner. In particular, the personal computer PC compares the reception power information $P_{MTR}$ sent back from the portable radio terminal MT with a required reference value $P_{REF-PC}$ and controls the emission power $P_{PCS}$ of the light emitting device 36B in accordance with a difference between the reception power information $P_{MTR}$ and the reference value $P_{REF-PC}$. Further, for the reference value $P_{REF-PC}$, a value corresponding to a minimum reception light power value with which infrared communication can be performed appropriately is set, and the emission power $P_{PCS}$ of the light emitting device 36B is controlled so that, when the communication distance is short, a low emission power $P_{PCS}$ may be used.

Here, in order to distinguish the present method from the other control methods in the following description, two control names (control modes 1 and 2) are defined. In particular, the control mode 1 is a mode wherein the reception power $P_{MTR}$ is detected by the reception power detection section 40 and the emission power $P_{MTS}$ of the apparatus itself is adjusted based on the reception power $P_{MTR}$ like the present portable radio terminal MT, and thus signifies a mode wherein the emission power is controlled based on the magnitude of the reception power value detected by the apparatus itself. The control mode 2 signifies a mode wherein the emission power $P_{PCS}$ of the apparatus itself is controlled based on the power $P_{MTR}$ received by and sent back from the other party of infrared communication (in this instance, the portable radio terminal MT) like the personal computer PC.

It is to be noted that the keyboard 33, mouse 34 and display unit 35 are connected to the personal computer PC through connectors 33A, 34A and 35A, respectively, similarly as in the first embodiment described hereinabove.

Consequently, the present personal computer PC exhibits original personal computer functions using the CPU 30, ROM 31, RAM 32, keyboard 33, mouse 34, display unit 35 and so forth similarly as in the first embodiment described hereinabove. Besides, in the light receiving device 36A of the light receiving-emitting device unit 36, a data signal of power information data $P_{MTR}$ and so forth from the personal computer PC received by the portable radio terminal MT is processed by the CPU 30, ROM 31, RAM 32 and so forth, whereas transmission data from the personal computer PC are processed by the CPU 30, ROM 31, RAM 32 and so forth and transmitted as a transmission signal (transmission data) through the LED driver 36C' of the AGC type from the light emitting device 36B to the portable radio terminal MT with an infrared communication function as the other party of communication. In this instance, the personal computer PC varies, based on reception power $P_{MTR}$ detected by and sent back from the portable radio terminal MT with an infrared communication function, the gain of the LED driver 36C' of the AGC type to control the emission power $P_{PCS}$ of the light emitting device 36B.

It is to be noted that the cradle CD as an infrared communication apparatus has the block construction shown in FIG. 2 and is used with the portable radio terminal MT received thereon. Consequently, the emission power from the light emitting device 21B always has a fixed value $P_{CDS}$.

As the present embodiment has such a construction as described above, the portable radio terminal MT first detects the other party of infrared communication by the communication object party detection section 8 thereof and performs, if the other party of infrared communication is the cradle CD, communication with the emission power $P_{MTS}$ controlled to a low level.

On the other hand, if the other party of infrared communication is the personal computer PC, then the portable radio terminal MT performs data communication with the personal computer PC with an emission power output suitable for the communication distance. In particular, if the communication distance is 100 cm, then the portable radio terminal MT outputs a normal emission power $P_{MTS}$, but if the communication distance is smaller than 100 cm, then a decreased emission power $P_{MTS}$ is used in accordance with the decreased communication distance to perform communication. Here, the emission power control methods of the personal computer PC and the portable radio terminal MT are such as described below.

The portable radio terminal MT detects, by the reception power detection section 40 thereof, the magnitude of the power of light transmitted from the personal computer PC and compares the detected value $P_{MTR}$ and a required reference value $P_{REF-MT}$. The, if a result of the comparison falls within a predetermined range, then it is determined that the communication distance to the personal computer PC is appropriate, and the emission power value $P_{MTS}$ of the light emitting device 10B is not varied. On the other hand, if the detected value $P_{MTR}$ is excessively high, then it is determined that the communication distance to the personal computer PC is excessively short, and the emission power $P_{MTS}$ of the light emitting device 10B is controlled so as to be decreased in value. Simultaneously, the portable radio terminal MT transmits the reception power $P_{MTR}$ on transmission data to the personal computer PC.

The personal computer PC extracts, by the reception power information reception section 45 thereof, the reception power information $P_{MTR}$ from within the data sent back from the portable radio terminal MT and controls the infrared emission power $P_{PCS}$ of the light emitting device 36B. If the reception power information $P_{MTR}$ represents that the communication distance is excessively short, then the personal computer PC decreases the emission power $P_{PCS}$ of the light emitting device 36B, but otherwise if the reception power information $P_{MTR}$ represents an appropriate value, then the personal computer PC determines that the communication distance is appropriate and does not perform emission power control. In other words, the portable radio terminal MT acts like a mirror which reflects the emission power value of the personal computer PC, and the personal computer PC can recognize the magnitude of the power of the light emitted from the personal computer PC itself from a reception condition from the portable radio terminal MT.

In this manner, the present portable radio terminal MT detects the other party of infrared communication and controls the emission power $P_{MTS}$ depending upon whether the other party of infrared communication is the cradle CD or the personal computer PC. Then, when the other party of communication is the personal computer PC, the portable radio terminal MT communicates with a normal set high value (high power) if the communication distance is 100 cm, but when the communication distance is shorter than 100 cm, the portable radio terminal MT decreases the emission power in accordance with the reduced communication distance to perform data communication. Consequently, communication can be performed with an appropriate magnitude of power and fine control can be achieved.

Figure 17:
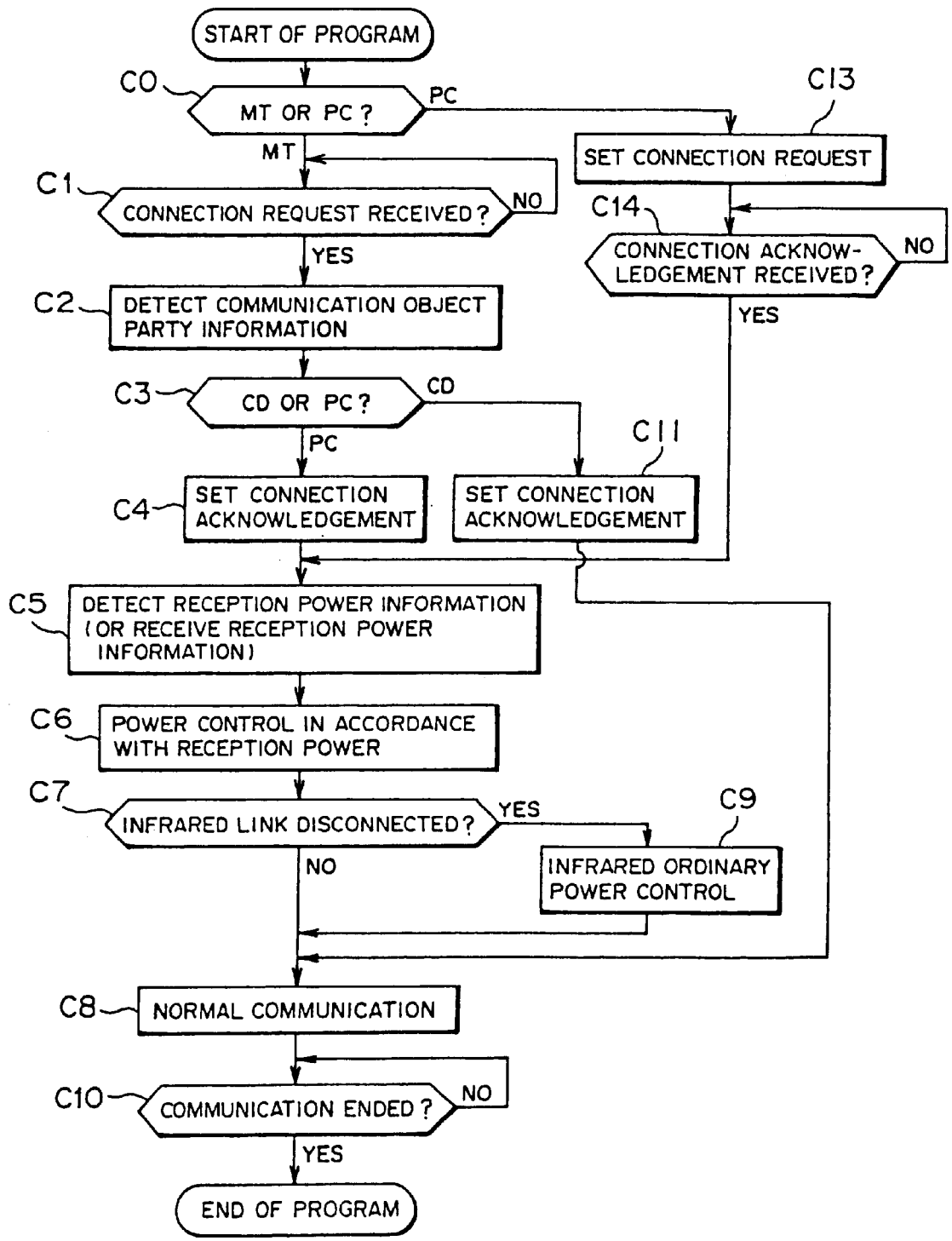
FIG. 17 is a flow chart illustrating an outline of control of the portable radio terminal with an infrared communication function and the personal computer according to the second embodiment of the present invention.

An outline of control by the portable radio terminal MT side including the various manners of control is illustrated in FIG. 17. Referring to FIG. 17, first in step C0, the MT route is taken since the present control is performed by the portable radio terminal MT. Thus, the portable radio terminal MT confirms in step C1 whether or not a connection request has been received from the other party of infrared communication. If a connection request has been received (the YES route of step C1), then the portable radio terminal MT performs detection of communication object party information in step C2. It is to be noted that, if no connection request has been received, then the portable radio terminal MT waits until it receives a connection request (the NO route of step C1). Such communication object party information may not necessarily be detected through infrared communication, but may be obtained from the cradle connection terminal. In the latter case, the present step is omitted similarly as in the modification to the first embodiment described hereinabove.

On the other hand, if the other party of infrared communication is the personal computer PC, then the PC route of step C3 is taken, and the portable radio terminal MT performs setting of a connection acknowledgement and sends back the connection acknowledgement to the other party of communication in step C4. Then, the portable radio terminal MT detects reception power $P_{MTR}$ of light sent thereto from the personal computer PC in step C5, and performs emission power control in response to the reception power information $P_{MTR}$ in step C6. Further, in step C7, the portable radio terminal MT supervises whether or not disconnection of the infrared link has occurred, and if the infrared link has been disconnected, then the YES route of step C7 is taken and the infrared emission power $P_{MTS}$ is returned to its normal set value in step C9. But if the infrared link has not been disconnected, then the NO route of step C7 is taken, and normal communication with an emission power controlled appropriate value is performed in step C8.

While the normal communication continues, it is supervised whether or not the communication is ended (the NO route of step C10). If the communication is ended, then the YES route of step C10 is taken, and the program comes to an end.

On the other hand, if the other party of infrared communication is the cradle CD in step C3, then the CD route of step C3 is taken, and the portable radio terminal MT performs setting of a connection acknowledgement and sends back the connection acknowledgement to the other party of communication in step C11. Then, the portable radio terminal MT performs normal communication with the emission power $P_{MTS}$ controlled to the low level in step C8.

Meanwhile, an outline of control by the personal computer PC side is such as follows. In particular, the PC route is taken in step C0 of FIG. 17, and then in step C13, the personal computer PC sets a connection request and transmits a connection request signal to the portable radio terminal MT. Further, in step C14, the personal computer PC waits that a connection acknowledgement signal is received (the NO route of step C14). If a connection acknowledgement signal is received, then the YES route of C14 is taken, and the personal computer PC receives reception power information $P_{MTR}$ detected by the portable radio terminal MT in step C5. Then, the personal computer PC performs emission power control in response to the reception power information $P_{MTR}$ in step C6. Thereafter, the personal computer PC performs its control in a substantially similar manner as in the control of the portable radio terminal MT side.

In this manner, the portable radio terminal MT can perform communication with a minimum emission power when the other party of infrared communication thereof is the cradle CD, and accordingly, low power consumption is promoted. On the other hand, when the portable radio terminal MT communicates a signal in an infrared frequency band with the personal computer PC, it uses the method of controlling the infrared emission power $P_{MTS}$ by using the reception power information $P_{MTR}$ from the personal computer PC and the infrared object party information detected by the communication object party detection section 8. In particular, the portable radio terminal MT detects the reception power $P_{MTR}$ by the reception power detection section 40 thereof and recognizes by the communication object party detection section 8 thereof that the other party of communication is the personal computer PC, and then performs its control. Then, the portable radio terminal MT recognizes, from the magnitude of the reception power information $P_{MTR}$ from the personal computer PC detected by the reception power detection section 40 of the portable radio terminal MT, over what communication distance it opposes the personal computer PC. Further, the personal computer PC can recognize from the reception power $P_{MTR}$ of light sent back from the portable radio terminal MT whether or not the communication distance between the personal computer PC itself and the portable radio terminal MT is short. In this manner, between the portable radio terminal MT and the personal computer PC, infrared communication in a minimum emission power condition in accordance with the communication distance can be performed. Thus, since communication can be performed without outputting a useless emission power, low power consumption by appropriate emission power control can be achieved.

B1. Modification to the Second Embodiment of the Invention

On the contrary, the control manners of the portable radio terminal MT and the personal computer PC may be exchanged for each other, that is, the personal computer PC may use the control mode 1 while the portable radio terminal MT uses the control mode 2. In particular, the personal computer PC has a reception power detection section and controls the emission power $P_{PCS}$ of the personal computer PC itself in accordance with reception power information $P_{PCR}$ from the portable radio terminal MT (a reception power value detected by the personal computer PC). Meanwhile, the portable radio terminal MT controls the emission power $P_{MTS}$ of the portable radio terminal MT itself in accordance with the reception power information $P_{PCR}$ transmitted from the personal computer PC.

It is to be noted that, also in the present modification, in order to perform control, it is presumed that both of the portable radio terminal MT and the personal computer PC normally output an infrared emission power sufficient to perform communication over the distance of approximately 100 cm.

Figure 18:
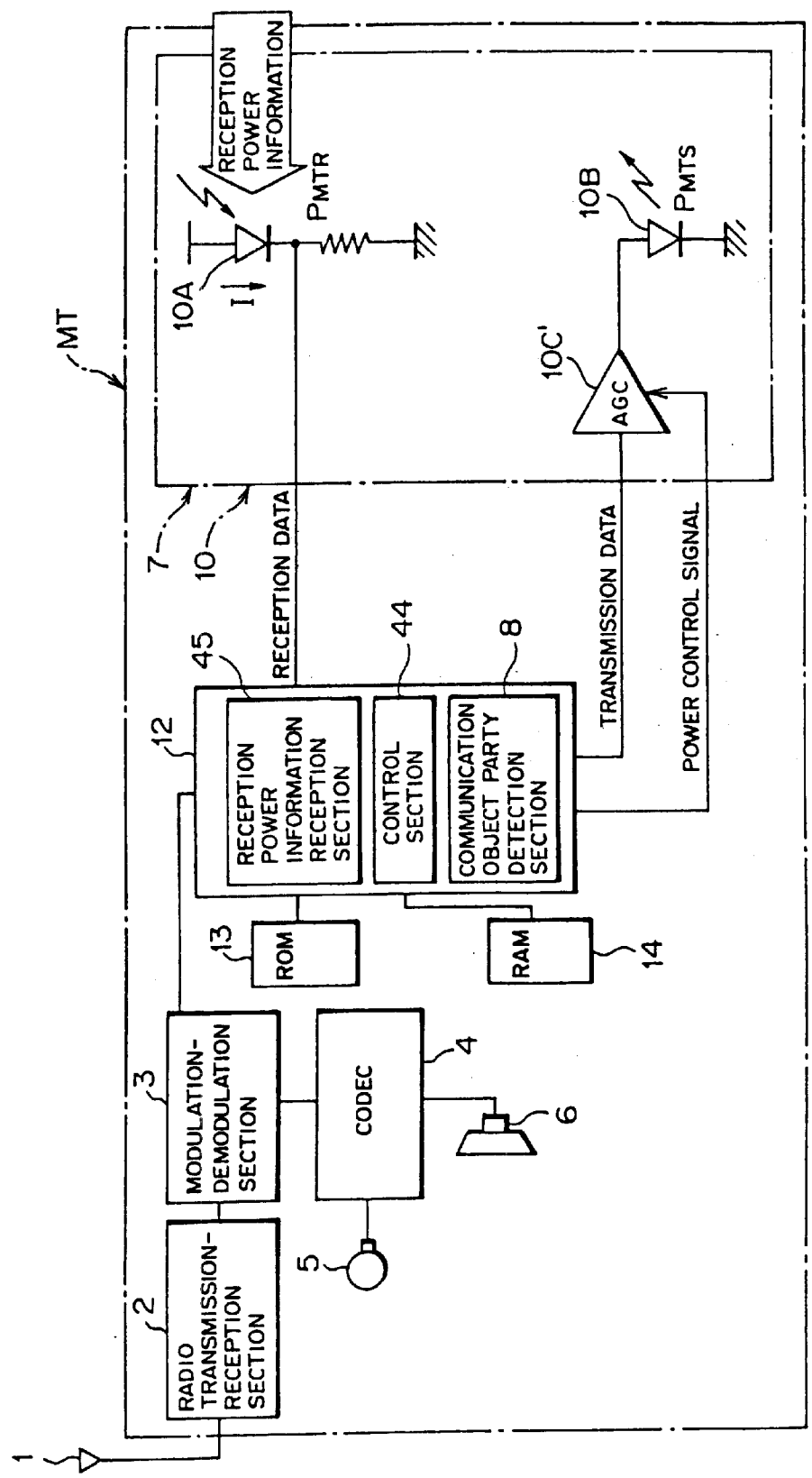
FIG. 18 is a block diagram showing a construction of a portable radio terminal with an infrared communication function according to another modification to the first embodiment of the present invention.
Figure 19:
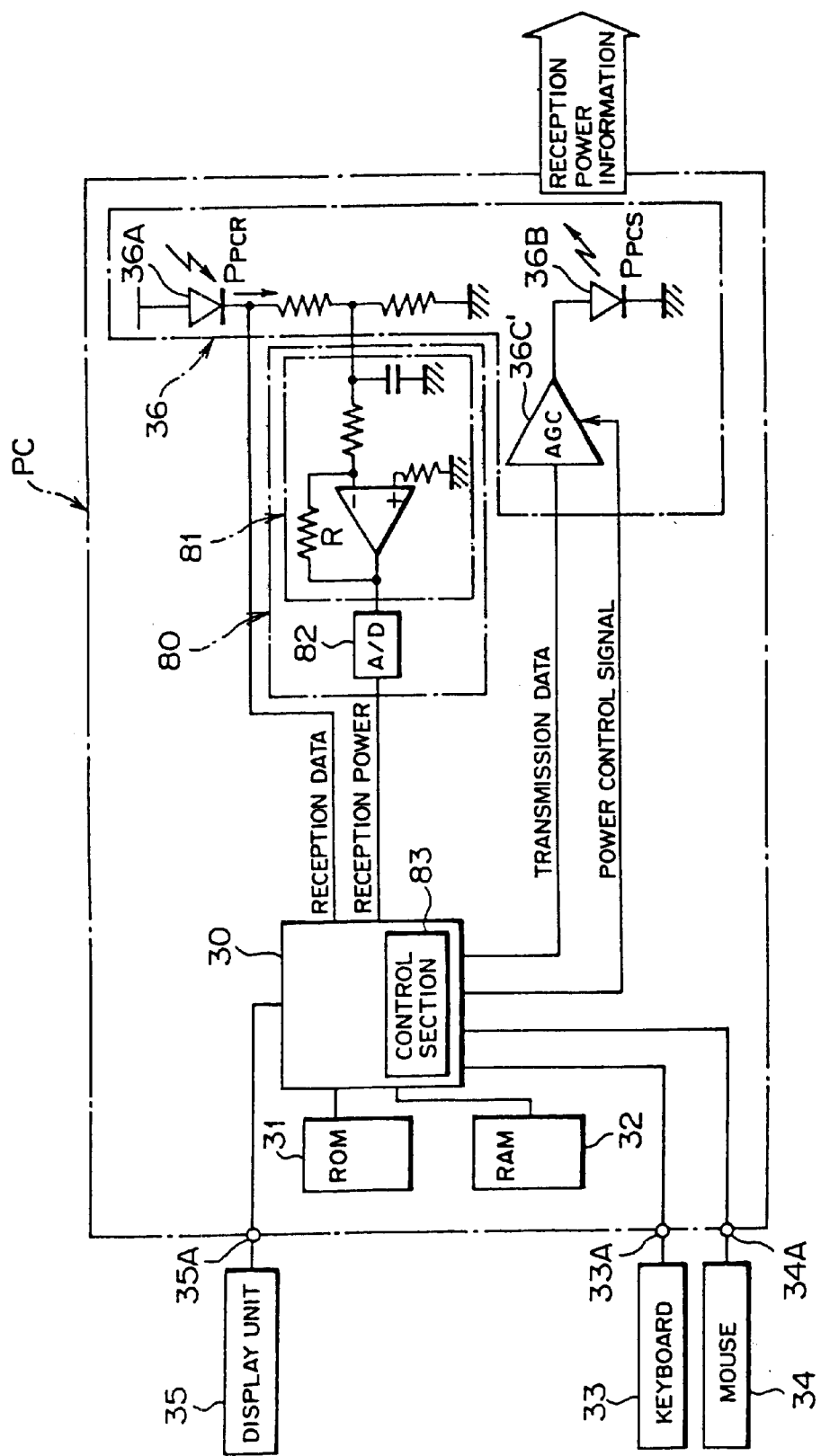
FIG. 19 is a block diagram showing a construction of a personal computer according to a further modification to the first embodiment of the present invention.

A block construction of the portable radio terminal with an infrared communication function in this instance is shown in FIG. 18 while a block construction of the personal computer PC is shown in FIG. 19. Referring first to FIG. 18, the portable radio terminal MT shown includes an infrared communication section 7 for transmitting and receiving a signal in an infrared frequency band, a communication object party detection section 8 for detecting infrared communication object party information (whether the personal computer PC or the cradle CD) from data received from the other party of infrared communication through the infrared communication section 7, a reception power information reception section (reception power information reception means) 45 for receiving (extracting) reception power information $P_{PCR}$ detected by and transmitted from the personal computer PC as the other party of infrared communication, and a control section 44 for controlling the emission power $P_{MTS}$ of the infrared communication section 7 in response to the reception power information $P_{PCR}$ extracted by the reception power information reception section 45 and the infrared communication object party information detected by the communication object party detection section 8.

Meanwhile, the personal computer PC shown in FIG. 19 includes a light receiving-emitting device unit 36 which functions as an infrared communication section for transmitting and receiving a signal in an infrared frequency band, a reception power detection section 80 for detecting reception power information $P_{PCR}$ from the portable radio terminal MT, and a control section 83 for controlling the emission power $P_{PCS}$ of the light receiving-emitting device unit 36 in response to the reception power information $P_{PCR}$ detected by the reception power detection section 80.

The light receiving-emitting device unit 36 includes a light receiving device 36A such as a photodiode, a light emitting device 36B such as a light emitting diode (LED), a light emitting device driver circuit (LED driver) 36C, and so forth. The reception power detection section (reception power detection means) 80 includes an amplification section 81 and an A/D conversion section 82 similarly to the reception power detection section 40 provided in the portable radio terminal MT in the second embodiment.

The other constructions of the portable radio terminal MT and the personal computer PC are similar to those of the portable radio terminal MT and the personal computer PC according to the second embodiment shown in FIGS. 15 and 16, and overlapping description of them is omitted herein to avoid redundancy. Further, since the cradle CD as an infrared communication apparatus has the block construction shown in FIG. 2 and is used with the portable radio terminal MT received thereon, the emission power $P_{PCS}$ from the light emitting device 21B always assumes a fixed value $P_{CDS}$.

As the portable radio terminal MT and the personal computer PC have such constructions as described above, first the portable radio terminal MT performs detection of the other party of infrared communication by the communication object party detection section 8 thereof, and performs, if the other party of infrared communication is the personal computer PC, communication with the emission power value $P_{MTS}$ thereof controlled to the low level.

The present portable radio terminal MT performs, if the other party of infrared communication is the personal computer PC, data communication with an emission power output in accordance with the communication distance to the personal computer PC. In particular, if the communication distance is 100 cm, then the portable radio terminal MT outputs a normal emission power $P_{MTS}$, but as the communication distance decreases from 100 cm, then the portable radio terminal MT performs data communication with the emission power decreased in accordance with the decreased communication distance. Here, the emission power control methods of the personal computer PC and the portable radio terminal MT are such as described below.

In particular, the personal computer PC detects, by the reception power detection section 80 thereof, the magnitude of power of light transmitted from the portable radio terminal MT, and compares the thus detected value $P_{PCR}$ with a required reference $P_{REF-PC}$. Then, if a result of the comparison falls within a predetermined range, then the personal computer PC determines that the communication distance to the portable radio terminal MT is appropriate, and does not vary the value $P_{PCS}$ of the emission power of the light emitting device 36B. On the other hand, if the value $P_{PCR}$ detected is excessively high, then the personal computer PC determines that the communication distance to the portable radio terminal MT is excessively short, and the personal computer PC controls the light emitting device 36B so as to decrease the value of the emission power $P_{PCS}$ of the same. Simultaneously, the personal computer PC transmits the reception power information $P_{PCR}$ on transmission data to the portable radio terminal MT.

Then, the portable radio terminal MT extracts, by the reception power information reception section 45 thereof, the reception power information $P_{PCR}$ from the data sent back from the personal computer PC and controls the infrared emission power $P_{MTS}$ of the light emitting device 10B. If the reception power information $P_{PCR}$ represents that the communication distance is excessively short, then the portable radio terminal MT decreases the emission power $P_{MTS}$, but otherwise if the reception power information $P_{PCR}$ represents an appropriate value, then the portable radio terminal MT determines that the communication distance is appropriate and does not perform emission power control. In other words, the personal computer PC acts like a mirror which reflects the emission power value of the portable radio terminal MT, and the portable radio terminal MT can recognize the magnitude of the power with which the portable radio terminal MT is emitting light from the reception condition from the personal computer PC.

Control manners of the portable radio terminal MT and the personal computer PC in the present modification are substantially similar to those in the second embodiment described above except the step C5 of the flow chart of FIG. 17. In particular, they are substantially similar except that, in step C5 of FIG. 17, the portable radio terminal MT receives the reception power information $P_{PCR}$ from the personal computer PC and the personal computer PC detects the reception power information $P_{MTR}$ of light transmitted from the portable radio terminal MT.

In this manner, the portable radio terminal MT can perform, when the other party of infrared communication is the cradle CD, communication with a minimum emission power, and low power consumption is promoted. Further, in order for the portable radio terminal MT to perform communication of a signal in an infrared frequency band with the personal computer PC, a method is used wherein the portable radio terminal MT receives the reception power information $P_{PCR}$ detected by and transmitted from the personal computer PC and controls the infrared emission power based on a result of the detection. In particular, the personal computer PC recognizes, from the magnitude of the reception power information $P_{PCR}$ from the portable radio terminal MT detected by the reception power detection section 80 of the personal computer PC, over what communication distance it opposes the portable radio terminal MT. Further, the portable radio terminal MT can recognize, from the reception power information $P_{PCR}$ of light sent back from the personal computer PC, whether or not the communication distance between the portable radio terminal MT and the personal computer PC is short. In this manner, infrared communication in a minimum emission power condition can be performed in accordance with the communication distance between the portable radio terminal MT and the personal computer PC, and communication can be performed without outputting useless emission power. Consequently, appropriate and fine emission power control can be performed, and low power consumption can be achieved.

C. Third Embodiment of the Invention

Figure 20:
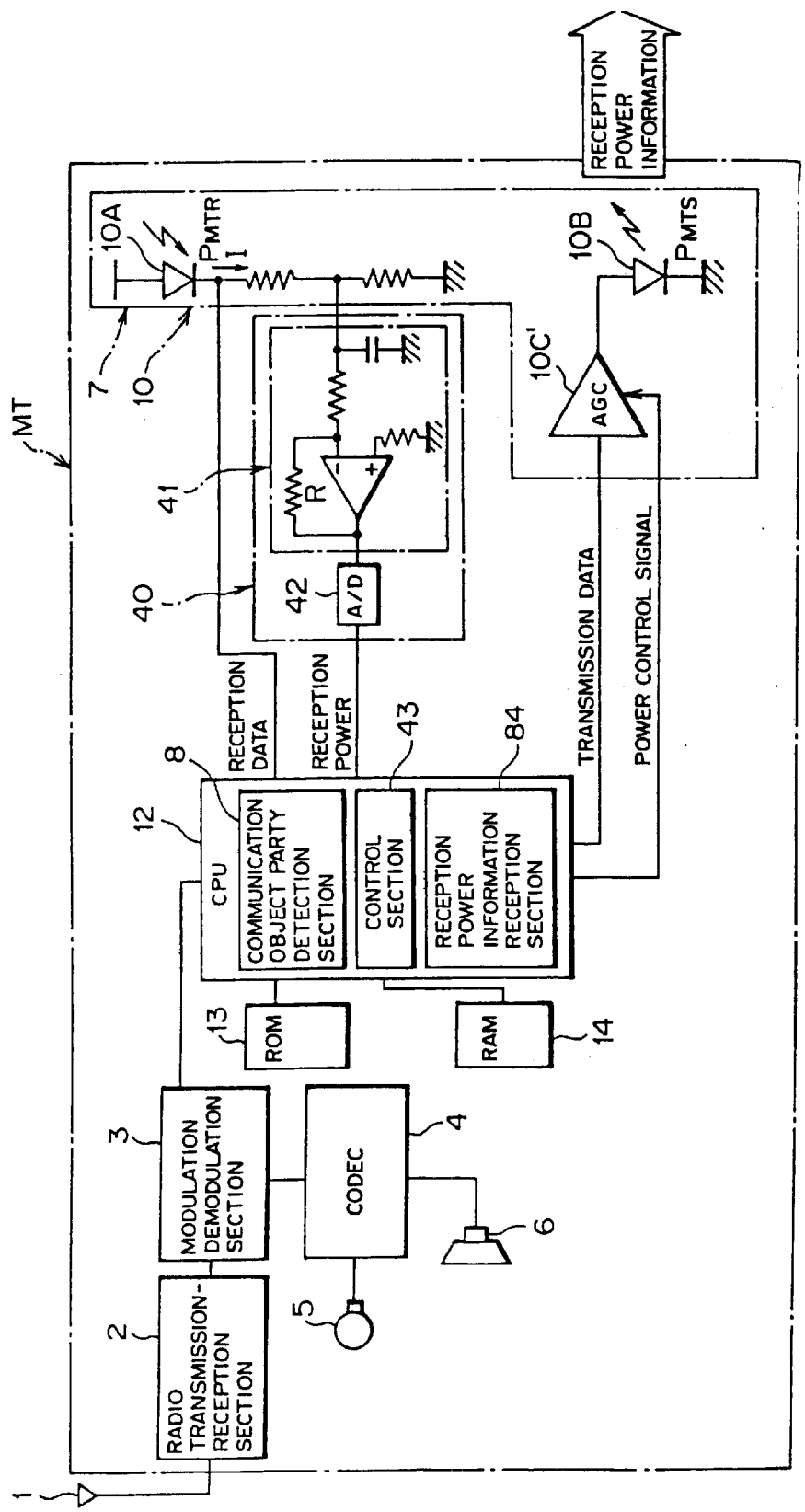
FIG. 20 is a block diagram showing a construction of a portable radio terminal with an infrared communication function according to a third embodiment of the present invention.

Both of the portable radio terminal MT and the personal computer PC may use the control mode 2. The portable radio terminal with an infrared communication function in this instance has such a block construction as shown in FIG. 20. Referring to FIG. 20, the portable radio terminal MT with an infrared communication function shown includes components which provide an original radio communication function including an antenna 1, a radio transmission-reception section 2, a modulation-demodulation section 3, a codec 4, a microphone 5, a speaker 6 and so forth similarly as in the first embodiment described hereinabove, and further includes an infrared communication section 7, a communication object party detection section 8, a reception power detection section 40, a control section 43, and a reception power information reception section 84. Further, as hardware components, the present portable radio terminal MT includes, in addition to the antenna 1, radio transmission-reception section 2, modulation-demodulation section 3, codec 4, microphone 5, speaker 6 and so forth mentioned above, a light emitting-receiving device unit 10, an amplification section 41, an A/D conversion section 42, a CPU 12, a ROM 13, a RAM 14 and so forth. Also the appearance of the portable radio terminal MT according to the present third embodiment is such as shown in FIGS. 4(a) and 4(b) similarly to that according to the first embodiment described hereinabove.

The infrared communication section 7 transmits and receives a signal in an infrared frequency band, and the functions thereof are exhibited by a light receiving device 10A such as a photodiode, a light emitting device (LED) 10B such as a light emitting diode, a light emitting device driver circuit (LED drive) 10C and so forth provided in the light emitting-receiving device unit 10. The communication object party detection section 8 detects infrared communication object party information (whether the personal computer PC or the cradle CD) from data received from the other party of infrared communication through the infrared communication section 7, and this function is exhibited by the CPU 12, ROM 13, RAM 14 and so forth. Further, the reception power detection section 40 detects a reception power $P_{MTR}$ on the reception side spaced by a required distance from the other party of infrared communication, and the function of the reception power detection section 40 is exhibited by the amplification section 41 and the A/D conversion section 42.

The control section 43 uses the reception power information $P_{MTR}$ detected by the reception power detection section 40 and the infrared communication object party information detected by the communication object party detection section 8 to control the emission power of the infrared communication section 7. When the other party of communication detected by the communication object party detection section 8 is the cradle CD, the control section 43 reduces the emission power $P_{MTS}$, but when the other party of communication is the personal computer PC or some other apparatus, the control section 43 controls the emission power $P_{MTS}$ of the infrared communication section 7 in response to the reception power $P_{MTR}$ detected by the reception power detection section 40.

The reception power information reception section 84 receives (extracts) the reception power information $P_{PCR}$ detected by and transmitted from the personal computer PC as the other party of infrared communication, and this function is exhibited by the CPU 12, ROM 13, RAM 14 and so forth. Thus, the portable radio terminal MT adopts the control mode 2.

Figure 21:
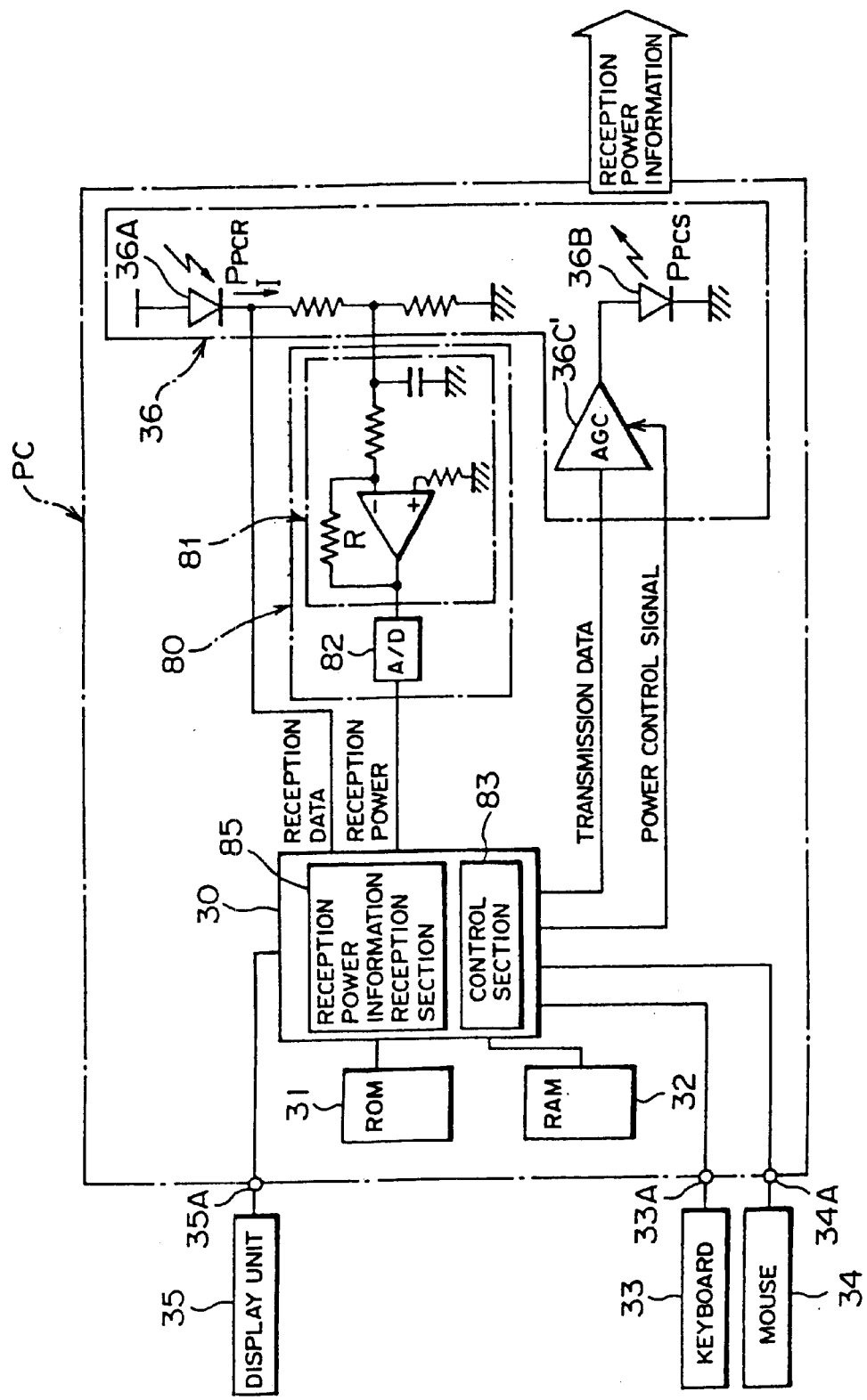
FIG. 21 is a block diagram showing a construction of a personal computer according to the third embodiment of the present invention.

Similarly, a block diagram of the personal computer PC according to the third embodiment of the present invention is shown in FIG. 21. Referring to FIG. 21, the personal computer PC shown has original personal computer functions including a CPU 30, a ROM 31, a RAM 32, a keyboard 33, a mouse 34, a display unit 35 and so forth, and further includes a light receiving-emitting device unit 36, a reception power detection section 80, a control section 83, and a reception power information reception section 85.

The light receiving-emitting device unit 36 includes, in addition to a light receiving device 36A such as a photodiode and a light emitting device 36B such as a light emitting diode (LED), a light emitting device driver circuit (AGC type LED driver) 36C' of the automatic gain control (AGC) type, and functions as an infrared communication section which transmits and receives a signal in an infrared frequency band to and from the portable radio terminal MT. The reception power detection section 80 detects reception power information $P_{PCR}$ from the portable radio terminal MT, and this function is exhibited by the amplification section 81 and the A/D conversion section 82.

The control section 83 uses the reception power information $P_{PCR}$ detected by the reception power detection section 80 to control the emission power of the infrared communication section (light receiving-emitting device unit 36), and performs control of the emission power $P_{PCS}$ of the infrared communication section (light receiving-emitting device unit 36) in response to the reception power $P_{PCR}$ detected by the reception power detection section 80. Further, this function is exhibited by the CPU 30, ROM 31, RAM 32 and so forth.

The reception power information reception section 85 receives (extracts) the reception power information $P_{MTR}$ detected by and sent back from the portable radio terminal MT as the other party of infrared communication, and this function is exhibited by the CPU 30, ROM 31, RAM 32, and so forth. Further, from this, the personal computer PC adopts the control mode 2. Further, as shown in FIG. 8, the window 17 of the portable radio terminal MT and hence the light emitting-receiving device unit 10 and the light receiving-emitting device unit 36 of the personal computer PC are disposed in an opposing relationship to each other within a range of approximately 100 cm.

It is to be noted that the cradle CD as an infrared communication apparatus has the block construction shown in FIG. 2 and is used with the portable radio terminal MT thereon, and consequently, the emission power from the light emitting device 21B always exhibits a fixed value $P_{CDS}$.

As the portable radio terminal MT and the personal computer PC have such constructions as described above, the portable radio terminal MT performs detection of the other party of infrared communication by the communication object party detection section 8 thereof and, if the other party of infrared communication is the cradle CD, then the portable radio terminal MT performs communication with the emission power value $P_{MTS}$ controlled to a low level by the control section 43. On the other hand, if the other party of infrared communication is the personal computer PC, then if the communication distance to the personal computer PC is 100 cm, then the control section 43 outputs an emission power $P_{MTS}$ of normal setting, but if the communication distance is shorter than 100 cm, then the portable radio terminal MT performs data communication with the emission power controlled to a low value in accordance with the shorter distance. Thus, fine emission power control can be performed. In other words, the portable radio terminal MT and the personal computer PC act like mirrors which reflect the emission power values of the other parties of infrared communication to them, and each of the portable radio terminal MT and the personal computer PC can recognize the magnitude of the power with which it is emitting light from a reception condition from the other party of infrared communication of the same.

In this manner, when the other party of infrared communication of it is the cradle CD, the portable radio terminal MT can perform communication with a minimum emission power and low power consumption is promoted. On the other hand, in order to communicate a signal in an infrared frequency band between the portable radio terminal MT and the personal computer PC, the portable radio terminal MT receives the reception power information $P_{PCR}$ detected by and sent back from the personal computer PC and controls the infrared emission power $P_{MTS}$ based on a result of the detection whereas the personal computer PC receives the reception power information $P_{MTR}$ detected by and transmitted from the portable radio terminal MT and controls the infrared emission power $P_{PCS}$ based on a result of the detection. Consequently, both of the portable radio terminal MT and the personal computer PC can perform infrared communication in a minimum emission power condition in accordance with the communication distance, and communication wherein useless emission power is not outputted can be performed. Thus, appropriate and fine emission power control can be performed, and low power consumption can be achieved.

D. Fourth Embodiment of the Invention

Both of the portable radio terminal MT and the personal computer PC may be constructed such that they use the control mode 1. In the embodiments described above, the reception power values $P_{MTR}$ and $P_{PCR}$ detected by the reception power detection section 40 (reception section of FIG. 15) and the reception power detection section 80 (reception section of FIG. 19) are processed and extracted once by the CPU 12 and the CPU 30, respectively. Both of the portable radio terminal MT and the personal computer PC input values detected by the reception power detection sections 40 and 80 directly to the LED drivers to control the emission powers $P_{MTS}$ and $P_{PCR}$ of the light emitting devices 10B and 36B, respectively. Also in the present embodiment, in order to perform control, it is presumed that both of the portable radio terminal MT and the personal computer PC output an infrared emission power sufficient to perform communication normally over a distance of approximately 100 cm.

Figure 22:
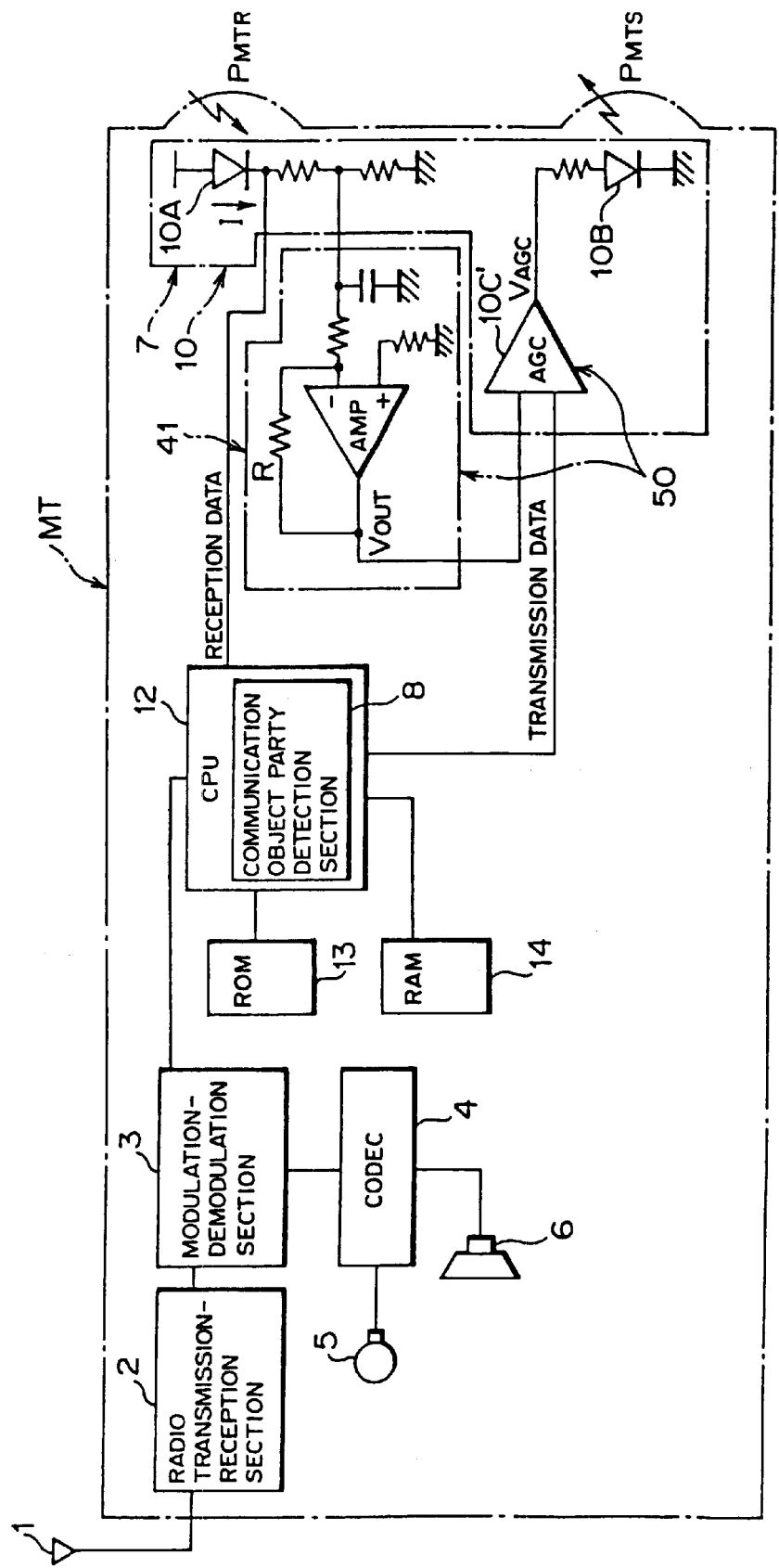
FIG. 22 is a block diagram showing a construction of a portable radio terminal with an infrared communication function according to a fourth embodiment of the present invention.

FIG. 22 shows a construction of the portable radio terminal MT according to the fourth embodiment of the present invention. Referring to FIG. 22, the portable radio terminal MT shown includes an infrared communication section 7, a communication object party detection section 8, an amplification section (reception power detection means) 41, and a control section 50. As hardware components, the portable radio terminal MT includes such components as an antenna 1, a radio transmission-reception section 2, a modulation-demodulation section 3, a codec 4, a microphone 5, a speaker 6 and so forth as described above, and further includes a light emitting-receiving device unit 10, the amplification section (reception power detection means) 41, a CPU 12, a ROM 13, a RAM 14 and so forth.

The infrared communication section 7 transmits and receives a signal in an infrared frequency band, and this function is exhibited by the light emitting-receiving device unit 10. The light emitting-receiving device unit 10 includes a light receiving device 10A, a light emitting device 10B, and an LED driver 10C'.

The communication object party detection section 8 detects the other party of infrared communication, and this function is exhibited by the CPU 12, ROM 13 and RAM 14. Reception data outputted from the light receiving device 10A provided in the light emitting-receiving device unit 10 are inputted to the CPU 12, in which they are decoded by the communication object party detection section 8 to recognize the other party of infrared communication.

The control section 50 uses infrared communication object party information detected by the communication object party detection section 8 to reduce, when it is detected that the other party of infrared communication is the cradle CD, the emission power $P_{MTS}$ of the portable radio terminal MT to its minimum power, but perform, when it is detected that the other party of infrared communication is the personal computer PC, emission power control in accordance with a communication distance to the personal computer PC. Further, the control section 50 performs control of the emission power $P_{MTS}$ of the infrared communication section 7 in response to the reception power information $P_{MTR}$ detected by the amplification section (reception power detection means) 41. This function is exhibited by the amplification section 41 and the LED driver 10C' provided in the light emitting-receiving device unit 10. It can be recognized from the foregoing that the portable radio terminal MT uses the control mode 1.

Transmitted light is O/E converted by the light receiving device 10A in the light emitting-receiving device unit 10, and reception power information $P_{MTR}$ from the other party of infrared communication is detected as a voltage based on the value of current flowing through the light receiving device 10A by the amplification section 41. The thus detected voltage is directly inputted to the LED driver 10C' in the light emitting-receiving device unit 10 to control the emission power $P_{MTS}$ of the light emitting device 10B in the light emitting-receiving device unit 10. Accordingly, since the detected reception power information $P_{MTR}$ is inputted directly to the light emitting device 10B, control is performed autonomously without intervention of the CPU 12. It is to be noted that the other components of the portable radio terminal MT are similar to those of the portable radio terminal MT according to the second embodiment described hereinabove with reference to FIG. 15, and accordingly, overlapping description of them is omitted here to avoid redundancy.

Figure 23:
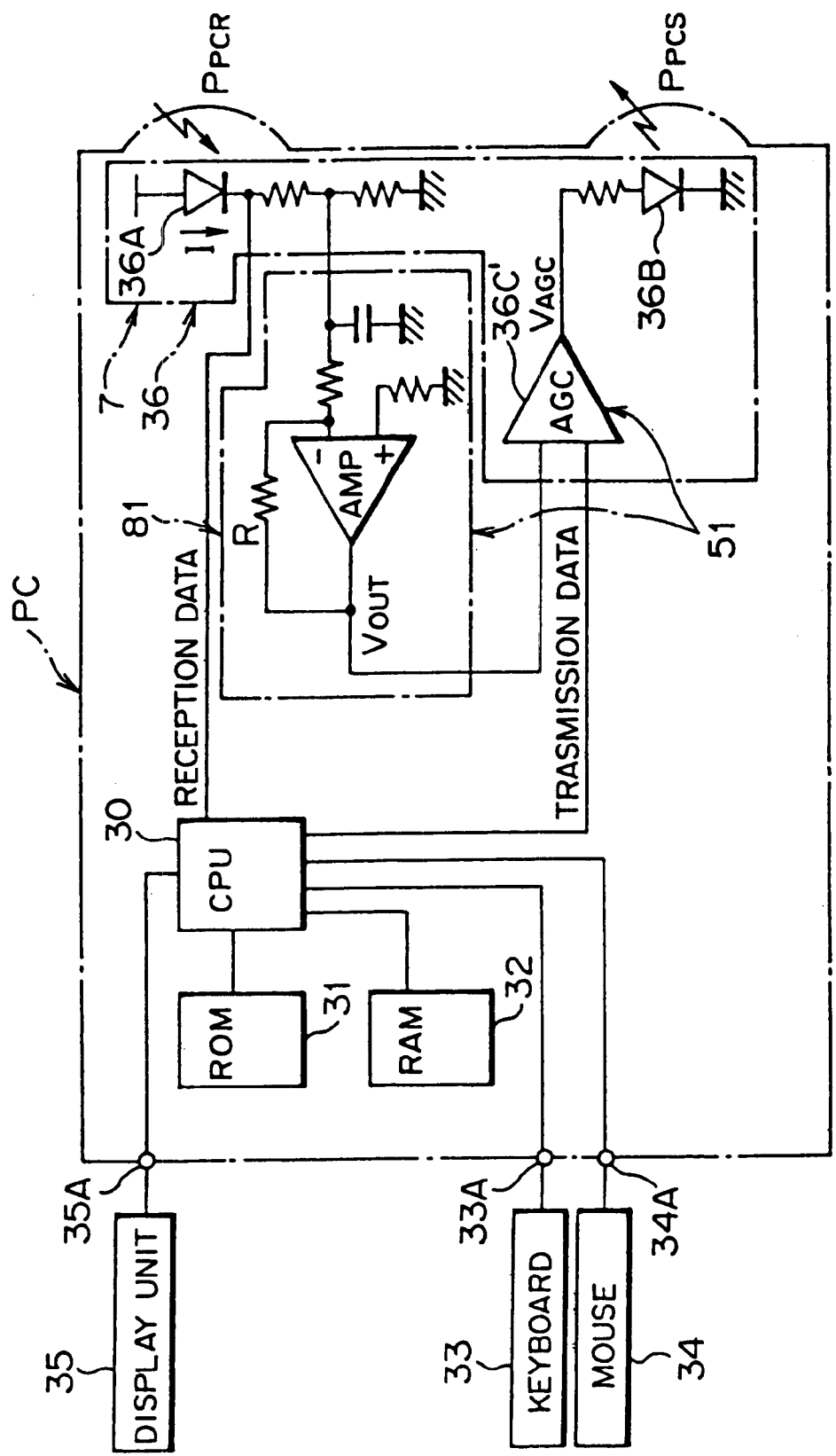
FIG. 23 is a block diagram showing a construction of a personal computer according to the fourth embodiment of the present invention.

Meanwhile, a construction of the personal computer PC according to the fourth embodiment of the present invention is shown in FIG. 23. Referring to FIG. 23, the personal computer PC shown includes an infrared communication section 7 for transmitting and receiving a signal in an infrared frequency band, and a control section 51 for controlling the emission power $P_{PCS}$ of the infrared communication section 7 in response to the reception power information $P_{PCR}$ detected by an amplification section (reception power detection means) 81. Further, as hardware components, the personal computer PC includes the light receiving-emitting device unit 36, the amplification section (reception power detection means) 81, a CPU 30, a ROM 31, and a RAM 32. Further, similarly as in the first embodiment described hereinabove, a keyboard 33, a mouse 34 and a display unit 35 are connected to the personal computer PC through connectors 33A, 34A and 35A, respectively. It is to be noted that the other components of the personal computer PC are similar to those of the personal computer PC according to the second embodiment described hereinabove with reference to FIG. 16, and accordingly, overlapping description of them is omitted here to avoid redundancy.

The function of the infrared communication section 7 is exhibited by the light receiving-emitting device unit 36, which includes a light receiving device 36A, a light emitting device 36B, and an LED driver 36C'. Further, the function of the control section 51 is exhibited by the amplification section 81 and the LED driver 36C' which his provided in the light receiving-emitting device unit 36. From this, it is recognized that the personal computer PC uses the control mode 1.

Light transmitted to the personal computer PC is O/E converted by the light receiving device 36A in the light receiving-emitting device unit 36, and reception power information $P_{PCR}$ from the other party of infrared communication is detected as a voltage based on a value of current flowing through the light receiving device 36A by the amplification section (reception power detection means) 81. Then, the thus detected voltage is inputted to the LED driver 36C' in the light receiving-emitting device unit 36 to control the emission power $P_{PCS}$ of the light emitting device 36B in the light receiving-emitting device unit 36. Accordingly, since the reception power information $P_{PCR}$ detected is inputted directly to the light emitting device 36B, control is performed autonomously without intervention of the CPU 30.

It is to be noted that the cradle CD as an infrared communication apparatus has the block construction shown in FIG. 2 and is used with the portable radio terminal MT thereon, and accordingly, the emission power from the light emitting device 21B normally assumes a fixed value $P_{CDS}$.

As the portable radio terminal MT, the personal computer PC and the cradle CD have such constructions as described above, the portable radio terminal MT detects the other party of infrared communication by the communication object party detection section 8 thereof, and if the other party of infrared communication is the cradle CD, then the portable radio terminal MT performs communication with the emission power value $P_{MTS}$ controlled to the low level, but if the other party of infrared communication is the personal computer PC, then the portable radio terminal MT performs data communication with an output in accordance with the communication distance to the personal computer PC. In particular, when the communication distance is 100 cm, the portable radio terminal MT outputs a normal emission power $P_{MTS}$, but where the communication distance is shorter than 100 cm, the portable radio terminal MT performs data communication with an emission power whose value is reduced in accordance with the reduced communication distance. The emission power controlling methods of the personal computer PC and the portable radio terminal MT are such as described below.

Referring to FIG. 22, reception light detected by the light receiving device 10A of the light emitting-receiving device unit 10 of the portable radio terminal MT is converted into a current, and this current is converted into a voltage by the amplification section (reception power detection means) 41. The voltage in this instance varies in accordance with the reception power $P_{MTR}$ and exhibits an increase if the reception power $P_{MTR}$ increases. Accordingly, as the output voltage of the amplification section 41 is fed back to the LED driver 10C' of the AGC type, if the reception power $P_{MTR}$ has a comparatively high value, then it is recognized that the other party of infrared communication is located at a comparatively short distance, and accordingly, control is performed so as to decrease the emission power $P_{MTS}$. Consequently, communication with a minimum power can be performed.

Similarly, reception light detected by the light receiving device 36A of the light receiving-emitting device unit 36 of the personal computer PC shown in FIG. 23 is converted into a current, and this current is converted into a voltage by the amplification section (reception power detection means) 81. The output voltage of the amplification section 81 is fed back to the LED driver 36C' of the AGC type. Thus, if the reception power information $P_{PCR}$ indicates a comparatively high value, then since it is recognized that the other party of infrared communication is located at a comparatively short distance, control is performed so as to decrease the emission power $P_{PCS}$. Consequently, communication with a minimum power can be achieved.

The control manners of the portable radio terminal MT side and the personal computer PC side in the present embodiment are similar to those described hereinabove in connection with the second embodiment except that the flow chart of FIG. 17 does not include the step C5 (detection of reception power information or reception of reception power information).

In this manner, in order to communicate a signal in an infrared frequency band between the portable radio terminal MT and the personal computer PC, a method is adopted wherein the portable radio terminal MT and the personal computer PC individually detect the reception power information $P_{MTR}$ and $P_{PCR}$ from the other parties of the infrared communication to them and controls the infrared emission powers $P_{MTS}$ and $P_{PCS}$ based on results of the detection.

In this manner, when the other party of infrared communication is the cradle CD, the present portable radio terminal MT can communicate with a minimum emission power and low power consumption can be promoted. Further, in order to communicate a signal in an infrared frequency band between the portable radio terminal MT and the personal computer PC, a method is adopted wherein the portable radio terminal MT detects the reception power information $P_{MTR}$ from the personal computer PC and controls the infrared emission power $P_{MTS}$ autonomously based on a result of the detection while the personal computer PC receives the reception power information $P_{MTR}$ detected by and transmitted from the portable radio terminal MT and controls the infrared emission power $P_{PCS}$ based on a result of the detection. In this manner, both of the portable radio terminal MT and the personal computer PC can perform infrared communication in a minimum emission power condition in accordance with the communication distance between them, and communication can be performed without consuming useless emission power. Accordingly, appropriate, fine and autonomously power control can be achieved, and low power consumption can be achieved.

E. Others

It is to be noted that, while, in the second to fourth embodiments and the modifications to them described above, the emission power control is performed by both of the portable radio terminal MT and the personal computer PC, the emission power control may otherwise be performed only by one of the portable radio terminal MT and the personal computer PC while the emission power of the other of the portable radio terminal MT and the personal computer PC is fixed.

Further, while, in the second embodiment described above, an LED driver of the AGC type is used so that the portable radio terminal MT and the personal computer PC may control the emission powers $P_{MTS}$ and $P_{PCS}$ continuously, it may be replaced, in the second embodiment described above, by an element corresponding to a K-value variable resistance section which allows the emission power to be switched among K stages (K is an integer equal to or larger than 3).

Further, while, in the third embodiment described above, the method used to recognize the magnitude of the reception power value $P_{MTR}$ by the portable radio terminal MT can be performed by the reception power detection section 40 or the reception power information $P_{PCR}$ detected by and sent back from the personal computer PC, the magnitude may be detected from either one of them. Where the two measures are provided, they can be used as main and spare measures.

Further, in the embodiments described above, suitable amplifiers (not shown) and reception band compensation circuits (not shown) may be interposed between the light receiving devices 10A, 21A and 36A and the CPUs 12, 22 and 30. In this instance, reception data at the outputs of the light receiving devices 10A, 21A and 36A are amplified by the respective amplifiers and then band-improved by the respective reception band compensation circuits, whereafter they are inputted to the respective CPUs. However, this does not have a bad influence on the superiority of the present invention.

Further, the present invention is not limited to the embodiments and the modifications described above, and can be carried out in various forms without departing from the spirit of the present invention.

Furthermore, in any of the embodiments described above, in addition to the personal computer PC, any apparatus with an infrared communication function can be used as the other party of infrared communication to the portable radio terminal MT only if it includes an infrared communication section for transmitting and receiving a signal in an infrared frequency band and a control section for varying the power of transmission light and can vary the power of the light output.

For example, the apparatus with an infrared communication function of the type mentioned may be a security apparatus for entry and exit into and from a building. In this instance, the security apparatus may be provided at an entrance for the security for entry and exit into and from a building such that a person may direct the portable radio terminal MT to the security apparatus to perform communication. Or, the apparatus with an infrared communication function may be provided on an outer face or the like of an automobile such that a person may direct the portable radio terminal MT to the light reception section of the apparatus to unlock the automobile. In this manner, the apparatus with an infrared communication function may have various forms of use. Further, the portable radio terminal MT may additionally have a detector which detects presence or absence of an object.

What is claimed is:

1. A portable radio terminal, detachably mountable on a vehicle-carried adapter, for infrared communication selectively with a vehicle-carried adapter as a first apparatus located within hailing distance, as a communication partner, and a second apparatus located remotely, as a communication partner, comprising:

an infrared communication section for transmitting and receiving signals in an infrared frequency band to and from a selected one of the vehicle-carried adapter and the second apparatus;

communication-partner detection means for detecting the second apparatus, whichever is currently in infrared communication with said terminal, as the communication partner; and control means, responsive to the detection of said communication-partner detection means, for controlling said infrared communication section in such a manner that an emission power of said infrared communication section is normal enough to ensure infrared communication if the detected communication partner is the vehicle-carried adapter, and that the emission power of said infrared communication is higher than such normal emission power if the detected communication partner is the second apparatus.

2. A portable radio terminal as claimed in claim 1, wherein said communication-partner detection means detects a signal unique to the communication partner of the infrared communication, from the signals received from a last-named communication partner.

3. A portable radio terminal as claimed in claim 1, wherein said communication-partner detection means detects information as to whether or not said portable radio terminal is physically connected with the first apparatus.

4. A portable radio terminal, detachably mountable on a vehicle-carried adapter, for infrared communication selectively with the vehicle-carried adapter located within hailing distance, as a communication partner, and a second apparatus located remotely, as a communication partner, comprising:

an infrared communication section for transmitting and receiving signals in an infrared frequency band to and from a selected one of the second apparatus and the vehicle-carried adapter;

an identification section for identifying the second apparatus or the vehicle-carried adapter, whichever is currently in infrared communication with said terminal, as the communication partner; and a control section, responsive to the identifying of said identification section, for controlling said infrared communication section in such a manner that an emission power of said infrared communication section is normal enough to ensure infrared communication if the communication partner is the second apparatus, and that the emission power of said infrared communication section higher than such normal emission power if the detected communication partner is the vehicle-carried adapter.

5. A method for controlling an infrared emission power when a portable radio terminal transmits and receives signals in an infrared frequency band to and from a selected one of a first apparatus located within hailing distance, as a communication partner with the terminal, and a second apparatus located remotely, as a communication partner with the terminal, comprising the steps of:

at the terminal detecting the first apparatus or the second apparatus, whichever is currently in infrared communication; and controlling the infrared emission power in accordance with the result of said detecting in such a manner that said infrared emission power is normal enough to ensure infrared communication if the detected communication partner is the second apparatus, and that said infrared emission power is lower than such normal infrared emission power if the detected communication partner is the first apparatus.

\* \* \* \* \*